United States Patent
Poe et al.

(10) Patent No.: US 11,269,145 B2
(45) Date of Patent: Mar. 8, 2022

(54) CABLE CONNECTION STRUCTURE FOR FIBER OPTIC HARDWARE MANAGEMENT

(71) Applicant: Google LLC, Mountain View, CA (US)

(72) Inventors: Charles Poe, Palo Alto, CA (US);
Mathew Berg, Charleston, SC (US);
John David Roselle, Pryor, OK (US)

(73) Assignee: Google LLC, Mountain View, CA (US)

( * ) Notice: Subject to any disclaimer, the term of this patent is extended or adjusted under 35 U.S.C. 154(b) by 0 days.

(21) Appl. No.: 16/942,149

(22) Filed: Jul. 29, 2020

(65) Prior Publication Data

US 2022/0035109 A1     Feb. 3, 2022

(51) Int. Cl.
G02B 6/38      (2006.01)
G02B 6/44      (2006.01)
F21V 8/00      (2006.01)
G02B 6/255     (2006.01)

(52) U.S. Cl.
CPC ......... *G02B 6/3897* (2013.01); *G02B 6/0006* (2013.01); *G02B 6/2553* (2013.01); *G02B 6/2558* (2013.01); *G02B 6/4441* (2013.01)

(58) Field of Classification Search
CPC .......................... G02B 6/4439; G02B 6/4498
See application file for complete search history.

(56) References Cited

U.S. PATENT DOCUMENTS

| | | |
|---|---|---|
| 4,964,685 A | 10/1990 | Savitsky et al. |
| 5,278,933 A | 1/1994 | Hunsinger et al. |
| 5,471,555 A * | 11/1995 | Braga .................. G02B 6/3878 385/114 |
| 6,424,782 B1 | 7/2002 | Ray |
| 6,571,048 B1 * | 5/2003 | Bechamps ........... G02B 6/4471 385/136 |
| 6,614,971 B2 * | 9/2003 | Sun ........................ G02B 6/368 385/114 |
| 6,751,392 B1 * | 6/2004 | Szilagyi ............. H01R 13/5833 385/134 |
| 7,228,047 B1 * | 6/2007 | Szilagyi ............... G02B 6/3878 385/134 |
| 7,266,281 B1 | 9/2007 | Flatau |
| 7,345,241 B2 | 3/2008 | Caveney et al. |
| 7,418,183 B2 | 8/2008 | Wittmeier et al. |
| 7,546,018 B2 | 6/2009 | Hendrickson et al. |
| 7,620,288 B2 | 11/2009 | Smrha et al. |
| 7,711,236 B2 | 5/2010 | Gonzalez et al. |

(Continued)

FOREIGN PATENT DOCUMENTS

WO      2015116589 A1     8/2015

OTHER PUBLICATIONS

Extended European Search Report for European Patent Application No. 21171574.3 dated Oct. 18, 2021. 9 pages.

*Primary Examiner* — Rhonda S Peace
(74) *Attorney, Agent, or Firm* — Lerner, David, Littenberg, Krumholz & Mentlik, LLP

(57) ABSTRACT

A cable connection structure for fiber optic hardware connection is provided. In one example, a cable connection structure includes at least one connector set including a plurality of fiber optic connectors. Each of the fiber optic connectors has a corresponding connecting cable coupled thereto. A cable sorter has a first end connected to the connecting cable. A ribbon cable is connected to a second end of the cable sorter through a fiber cable clamp.

18 Claims, 21 Drawing Sheets

(56) References Cited

U.S. PATENT DOCUMENTS

| | | | |
|---|---|---|---|
| 8,364,000 B2 | 1/2013 | Gonzalez et al. | |
| 8,457,461 B2 * | 6/2013 | Ott | G02B 6/2558 |
| | | | 385/103 |
| 10,514,518 B1 * | 12/2019 | Livingston | G02B 6/3825 |
| 10,558,007 B2 | 2/2020 | Brown et al. | |
| 10,663,687 B1 | 5/2020 | McCloud et al. | |
| 10,725,261 B2 * | 7/2020 | Kobayashi | G02B 6/4495 |
| 2005/0105873 A1 | 5/2005 | Reagan et al. | |
| 2008/0298764 A1 | 12/2008 | Bloodworth et al. | |
| 2010/0027955 A1 | 2/2010 | Parikh et al. | |

* cited by examiner

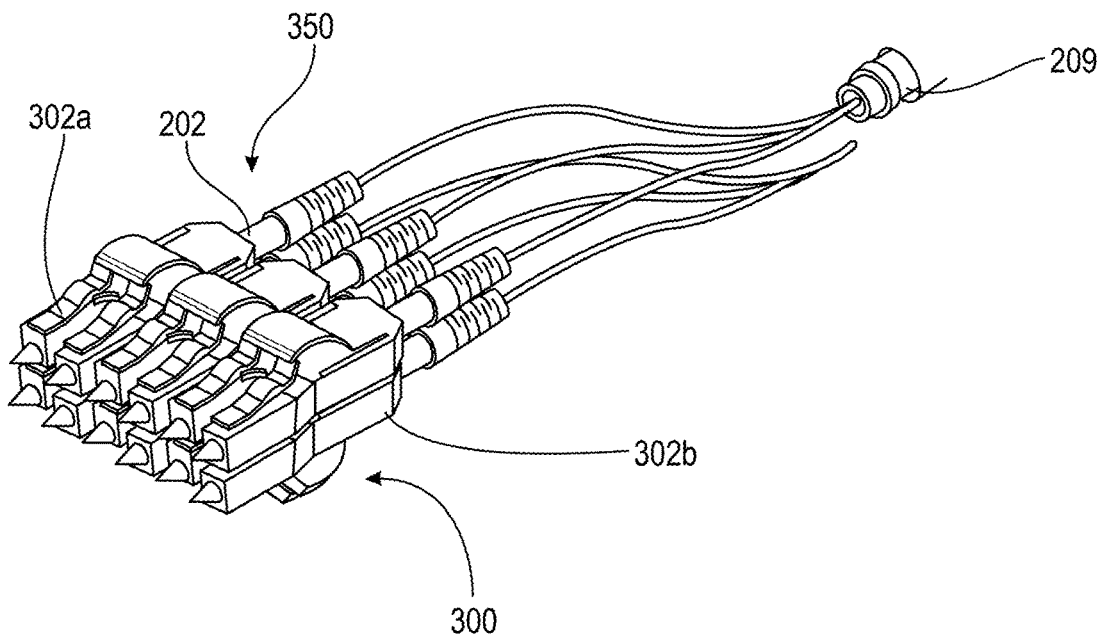
FIG. 3A
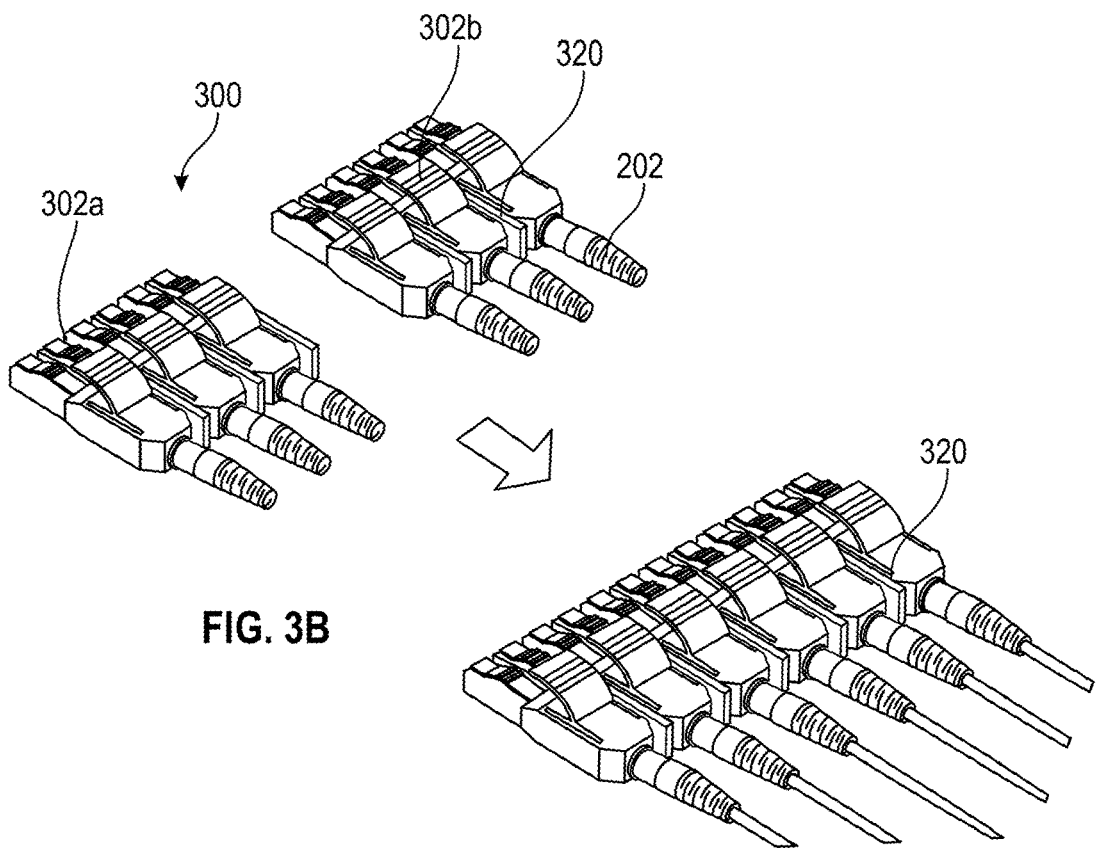
FIG. 3B
FIG. 3C

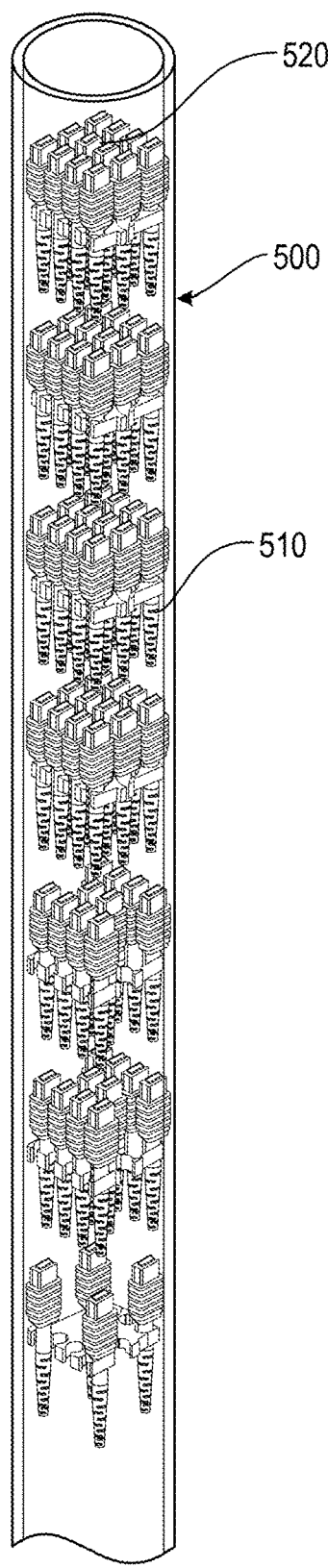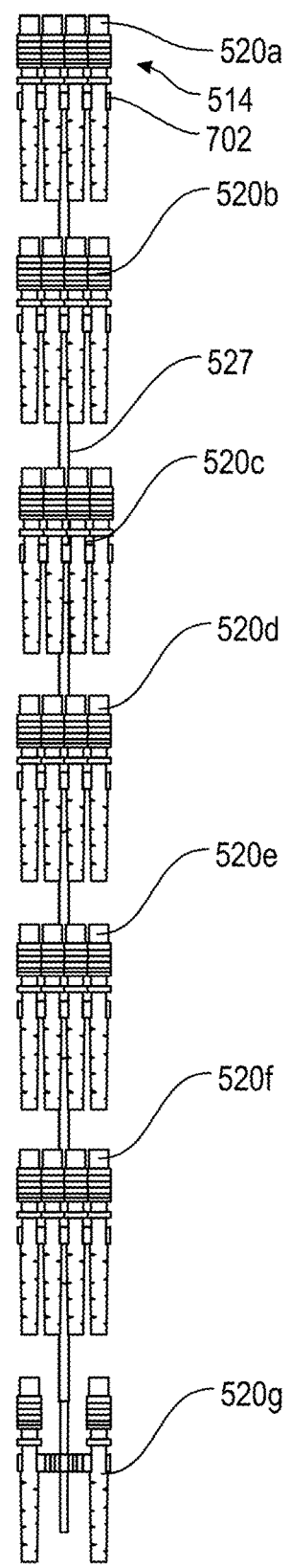
FIG. 7A
FIG. 7B

CABLE CONNECTION STRUCTURE FOR FIBER OPTIC HARDWARE MANAGEMENT

BACKGROUND

The capabilities of fiber optic connectors, fiber optic cable and fiber optic hardware have been continuously advanced to meet the demands of increasing numbers of users and high transmission rate requirements. Fiber optic hardware is increasingly being used for a variety of applications, such as data transmission, video, broadband voice and the like. The fiber optic cable, connectors or electrical cables are connected to a fiber optic module mounted in a patch panel assembly disposed in a cable management rack located in a data distribution center or a server room.

Splice boxes are often utilized for fiber optic cable connection, management and storage. The splice boxes may provide a joint where one end of fiber optic cable from a first location is spliced to a corresponding fiber optic cable from a second location, such as from a server room to a data distribution center, or vice versa. However, splicing fiber optic cables is very labor intensive and time consuming. In some situations when the fiber optic cables are not properly coordinated or connected, additional time may be needed for the technicians or operators to locate and reconnect the corresponding fiber optic cables, which may negatively impact the time and costs of installation. Thus, a time efficient, organized, and cost effective manner for fiber optic cable connection and/or management is needed.

BRIEF SUMMARY

A cable connection structure utilized connect fiber optic cables and/or fiber optic connectors is provided. In one example, a cable connection structure for fiber optic hardware connection is provided. In one example, a cable connection structure includes at least one connector set including a plurality of fiber optic connectors. Each of the fiber optic connectors has a corresponding connecting cable coupled thereto. A cable sorter has a first end connected to the connecting cable. A ribbon cable is connected to a second end of the cable sorter through a fiber cable clamp.

In some examples, a ribbon cable collector is disposed between the ribbon cable and the fiber cable clamp. The fiber cable clamp is removable from the cable sorter. In one example, the connector set is coupled to a center support. The connector set is coupled to the center support through a connector holder. In some examples, a connection tube having a center opening that allows the connector set to be disposed therein. A front cap is removably coupled a front end of the connection tube. An end cap is removably coupled to a back end of the connection tube.

In some examples, a gripper is disposed on the front cap. The end cap has a through hole that allows a cable sorter to pass therethrough. Each of fiber optic connectors is configured to couple to a corresponding adaptor disposed in a fiber optic module.

In some examples, the ribbon cable is configured to further connect to a cable collecting connector. The cable collecting connector is configured to connect the ribbon cable to one or more connecting cables. In some examples, multiple connector sets are coupled to the center support having a predetermined distance spaced away from each other. The multiple connector sets are coupled to the center support through a connector holder or a connector holder ring. The connector holder or the connector holder ring has a center opening that allows the center support to pass therethrough. The ribbon cable or the connecting cable is configured to pass through an opening defined in a wall.

Another aspect of the disclosure provides a cable management system. The cable management system includes a cable connection structure configured to directly connect a plurality of fiber cable connectors to a ribbon cable that forgoes a splicing structure. The cable connection structure includes at least one connector set including a plurality of fiber optic connectors. Each of the fiber optic connector has a corresponding connecting cable coupled thereto. A cable sorter has a first end connected to the connecting cable. A ribbon cable is connected to a second end of the cable sorter through a fiber cable clamp.

In some examples, the cable connection structure directly connects a first set of fiber optic connectors disposed in a first fiber optic module to a second set of the fiber optic connector disposed in a second fiber optic module. The first fiber optic module is positioned in a first room and the second fiber optic module is positioned in a second room different from the first room. The cable connection structure passes through a wall defined between the first room and the second room.

Another aspect of the disclosure provides method for fiber optic connector connection. The method includes connecting a cable connection structure between a first fiber optic module positioned in a first room and a second fiber optic module positioned in a second room, wherein the cable connection structure forgoes a splicing structure. The cable connection structure has a first end comprising a first group of fiber optic connectors positioned in the first fiber optic module and a second end comprising a ribbon cable connecting a second group of fiber optic connectors positioned in the second fiber optic module.

BRIEF DESCRIPTION OF THE DRAWINGS

FIGS. 3A-3C depict fiber optic connectors and inserts for holding fiber optic connectors according to aspects of the disclosure.

FIGS. 7A-7C depict a plurality of fiber optic connectors placed in a portion of a cable connection structure according to aspects of the disclosure.

DETAILED DESCRIPTION

This disclosure provides a cable connection structure for fiber optic hardware connection. The cable connection structure may provide a direct connection of cables or fiber optic connectors from different patch panel assemblies from different locations. The cable connection structure may provide a direct cable connection of the fiber optic connectors from a first patch panel located at a first place, such as a server room, to a second patch panel located at a second place, such as a data center room. The cable connection structure has a longitudinal connection tube that encloses a plurality of fiber optic connectors connected with a ribbon cable. Upon installation, the longitudinal connection tube may be removed, exposing the plurality of fiber optic connectors to be connected to an adaptor module located at a front end of a first fiber optic module while the ribbon cable to be connected to another set of adaptor located at a back end of a second fiber optic module. By direct connection between the first and the second fiber optic modules located at different patch panel assemblies, the use of a conventional splicing structure/enclosure for fiber optic hardware connection may be eliminated, thus reducing installation cost, labor, and splicing time.

Figure 1A:
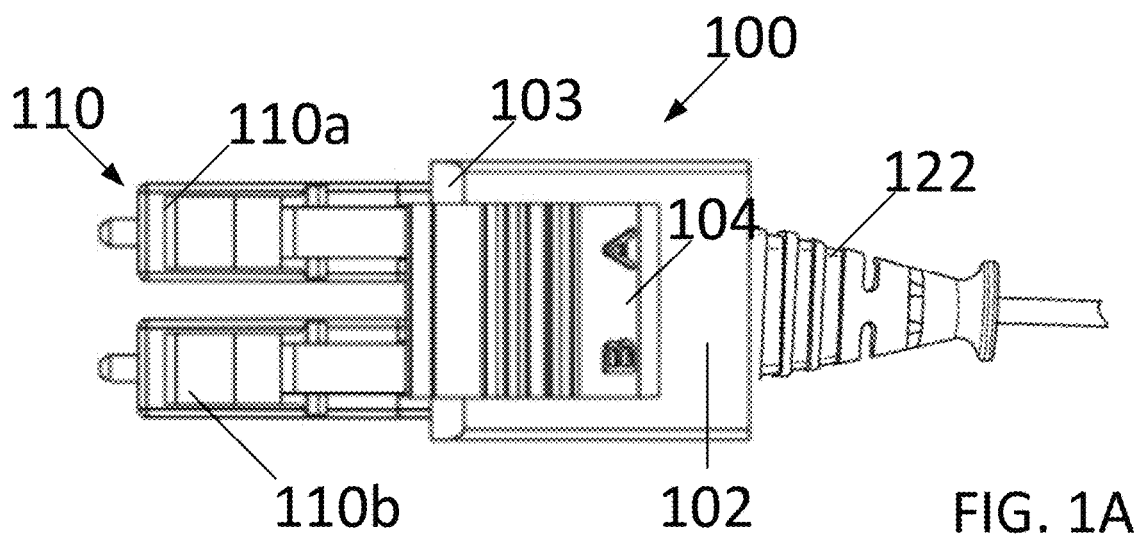
FIGS. 1A-1C depict an example of a fiber optic connector according to aspects of the disclosure.
Figure 1B:
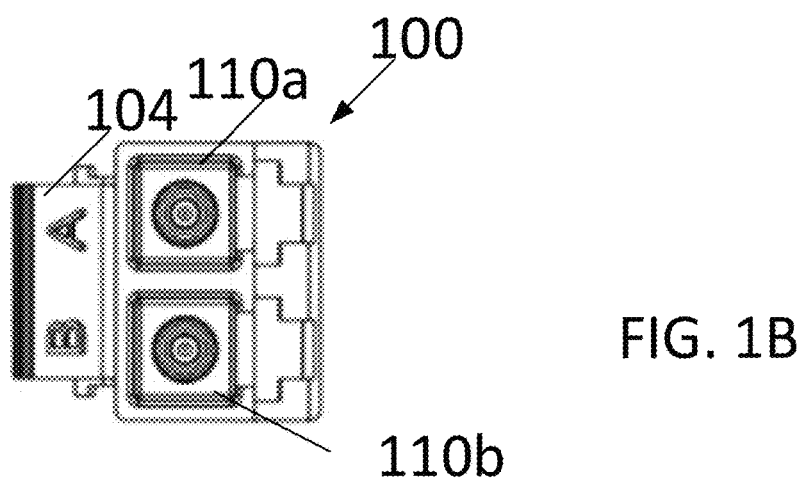
Figure 1C:
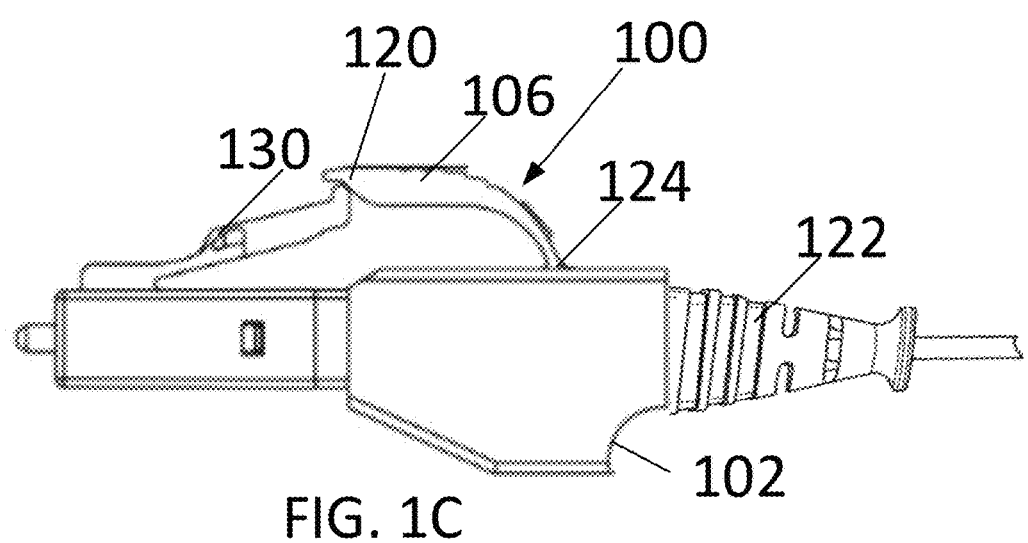

FIGS. 1A-1C depict an example of a fiber optic connector 100 that provides dual polarity configurations. FIG. 1A depicts a top view of the fiber optic connector 100. The fiber optic connector 100 comprises a body 102 that has two connector assemblies 110 (shown as 110a, 110b) connected thereto.

FIG. 1B depicts a front view of the fiber optic connector 100 illustrating the two connector assemblies 110 (shown as 110a, 110b) formed at a front section 103 of the fiber optic connector 100. Connector polarity indicia 104 is formed in the body 102 that indicates the polarity of the connector 100.

The body 102 encases two optic fibers connecting to the two connector assemblies 110a, 110b respectively. The two optic fibers enclosed in the body 102 are connected to a cable 122 connected to the body 102.

Figure 2:
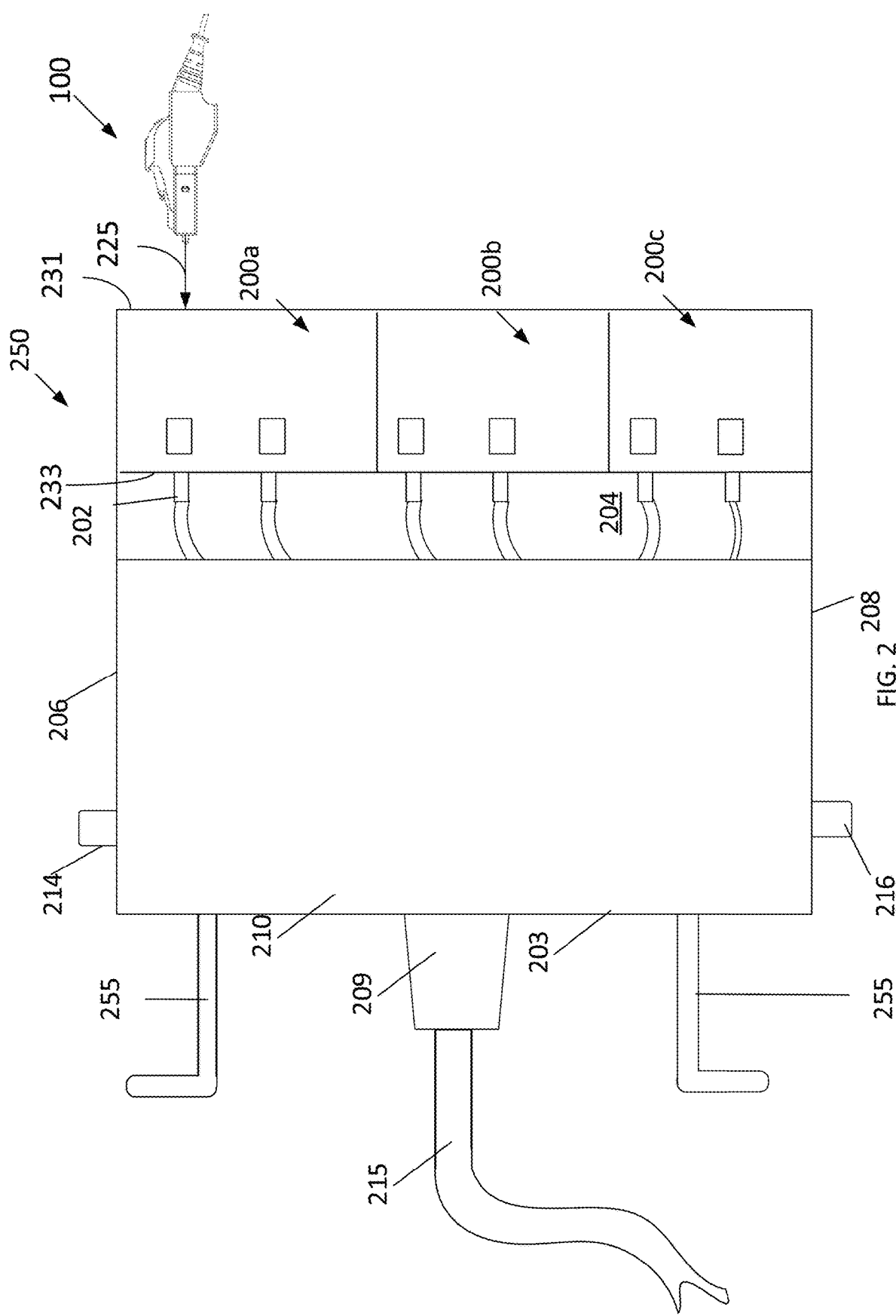
FIG. 2 depicts an example of a fiber optic module according to aspects of the disclosure.

FIG. 1C depicts a side view of the fiber optic connector 100. A latch 106 has a first end 120 connected to the connector assemblies 110a, 110b through a spring latch arm 130 and a second end 124 connected to the body 102. The latch 106 is used to secure the fiber optic connector 100 to an adaptor. The spring latch arm 130 releasably engages the latch 106. The spring latch arm 130 may be pressed to disengage from the latch 106. When the spring latch arm 130 is released and disengaged from the latch 106, the connector assemblies 110a, 110b may be inserted into an adapter in a predetermined insertion direction. The adaptor may be disposed in a fiber optic module (as shown in FIG. 2) mounted in a fiber management system. The latch 106 abuts against the spring latch arm 130 connected to the connector assemblies 110a, 110b for manually pressing the latter to move downwardly to allow disengagement between the connector assemblies 110a, 110b and the adapter and removal of the connector assemblies 110a, 110b out of the port. When a reversal of the polarity configuration is desired, the spring latch arm 130 may be pressed to discharge the connector assemblies 110a, 110b from the body 102. The connector assemblies 110a, 110b may then be flipped and rotated for 180 degrees for polarity reversal and the latch 106 will then be re-attached to the opposite site of the body 102.

FIG. 2 depicts a side view of a fiber optic module 250. A plurality of connecting cables 202 each connect to a respective fiber optic connector through adaptors in each adaptor modules 200a, 200b, 200c. It is noted that a portion 204 of a side 210 utilized to enclose the adaptor modules 200a, 200b, 200c and the cables 202 is cut off in FIG. 2 to show how the cables 202 are positioned in the interior region defined in the fiber optic module 250 under the side 210. The plurality of connecting cables 202 may be collected in an optic fiber ribbon cable 215 through a cable collecting connector 209 or an adaptor. Catches 214, 216 are disposed on a top edge 206 and a bottom edge 208 respectively. A pair of the finger hooks 255 is provided and disposed on a back end 203 of the fiber optic module 250 that allows operators or technicians to grab and pull the fiber optic module 250 for installation or uninstallation to and from a patch panel assembly.

In one example, a front end 231 of the fiber optic module 250 may receive a plurality of fiber optic connectors, such as the fiber optic connector 100 of FIG. 1, as shown in the arrow 225. In the example depicted in FIG. 2, each adaptor module 200a, 200b, 200c may receive two fiber optic connectors 100. A corresponding fiber optic connector (not shown) comprising the connecting cable 202 may be coupled from a rear end 233 of the adaptor module 200a, 200b, 200c and in electrical communication with the corresponding fiber optic connector 100 coupled from the front end 225. It is noted that the adaptor module 200a, 200b, 200c is configured to receive same or different types of the fiber optic connectors from both ends 231, 233 as needed for connection. The connecting cables 202 may be collected and formed as the ribbon cable 215 through the cable collecting connector 209.

FIGS. 3A-3C depict a connector set 350 having a plurality of fiber optic connectors 300 that may be placed and installed in a fiber optic module, such as the fiber optic module 250 depicted in FIG. 2. In the example depicted in FIG. 3A, six of the fiber optic connectors 300 are shown. It is noted that the number of the fiber optic connectors 300 may be varied as needed to accommodate different dimensions or sizes of the fiber optic module 250 selected for use. Although the example depicted in FIGS. 3A-3C are LC connectors, it is noted that the connector fiber optic connectors 300 may be any other suitable connectors, such as SC connectors, MPO connectors, or other types of connectors as needed. A first array 302a including three of the fiber optic connectors 300 are formed as an upper row, stacking on a second array 302b including another three of the fiber optic connectors 300 formed as a lower row. The first array 302a is vertically stacked up on the second array 302b. The vertical stacking-up configuration may provide a compact size of the connector set 350 to save space for transportation. A fiber optic connector inert 320, as shown in FIG. 3B, is utilized to hold and align the fiber optic connectors 300 in place, such as in a side by side configuration. The fiber optic connectors 300 may abut against each other through the fiber optic connector inert 320 positioned therebetween with the desired alignment. In the example depicted in FIG. 3B, the upper row of the first array 302a may be removed from the stacking, positioned apart from the lower row of the second array 302b. The first array 302a may be then placed in parallel and horizontally aligned with the second array 302b, such as a side by side configuration, to place the fiber optic connectors 300, as shown in FIG. 3C, in one array. The fiber optic connector inert 320 may assist holding the plurality of fiber optic connectors 300 in the desired position for installation.

Figure 4A:
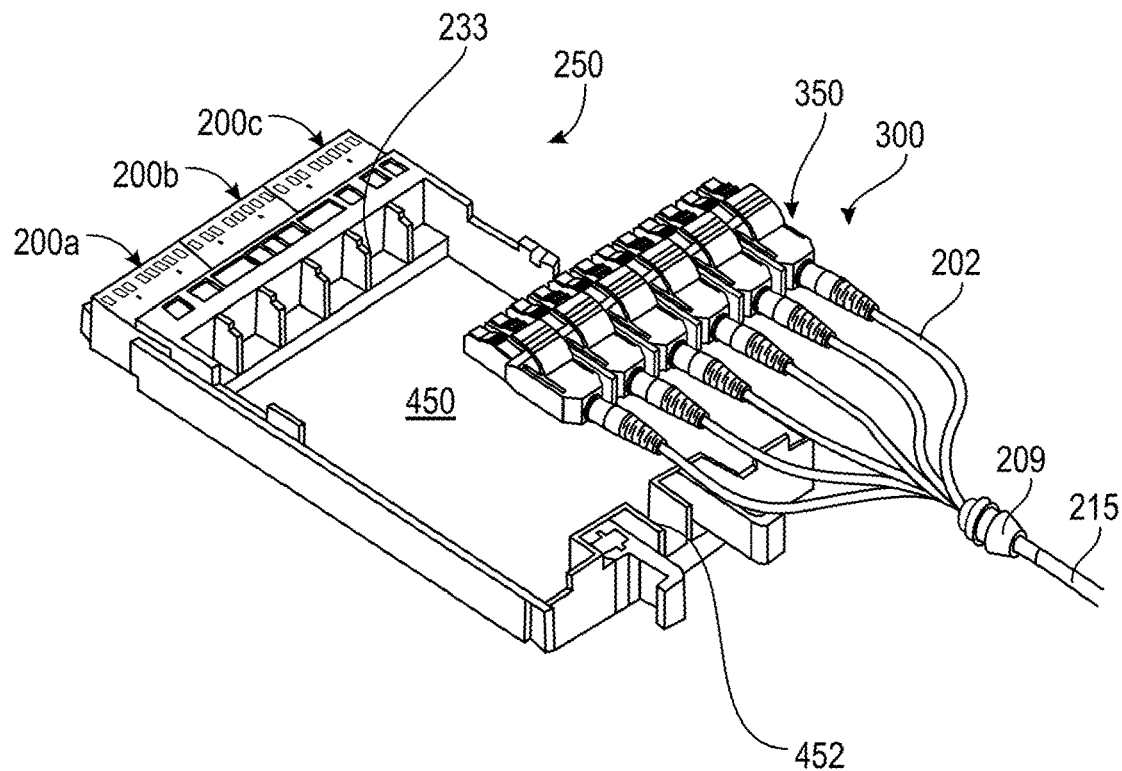
FIGS. 4A-4B depict a fiber optic module for storing a plurality of fiber optic connectors according to aspects of the disclosure.
Figure 4B:
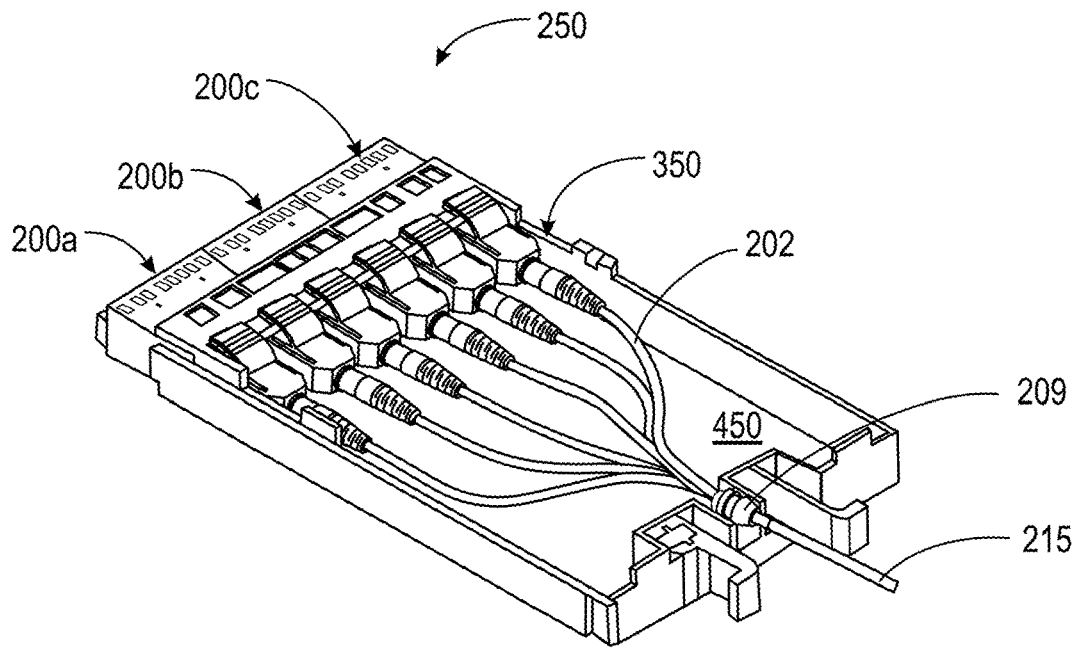

FIGS. 4A-4B depict the connector set 350 having the plurality of fiber optic connectors 300 being placed in a fiber optic module, such as the fiber optic module 250. In the example depicted in FIGS. 4A-4B, the side 210 of the fiber optic module 250 is removed for placement of the connector set 350 in an interior volume 450 of the fiber optic module 250. The plurality of fiber optic connectors 300, as shown in FIG. 4A, may be connected and inserted from the rear end 233 of the adaptor module 200a, 200b, 200c. After placement, each of the fiber optic connectors 300 is connected to a corresponding adaptor disposed in the adaptor module 200a, 200b, 200c in the interior volume 450 of the fiber optic module 250, as shown in FIG. 4B. The cable collecting connector 209 may be inserted in a slot 452 defined in the back end 203 of the fiber optic module 250. The side 210 of the fiber optic module 250 may then be installed and placed in the fiber optic module 250 to enclose the plurality of fiber optic connectors 300 in the interior volume 450 of the fiber optic module 250 upon completion of the placement of the fiber optic connectors 300 in the interior volume 450 of the fiber optic module 250.

Figure 5:
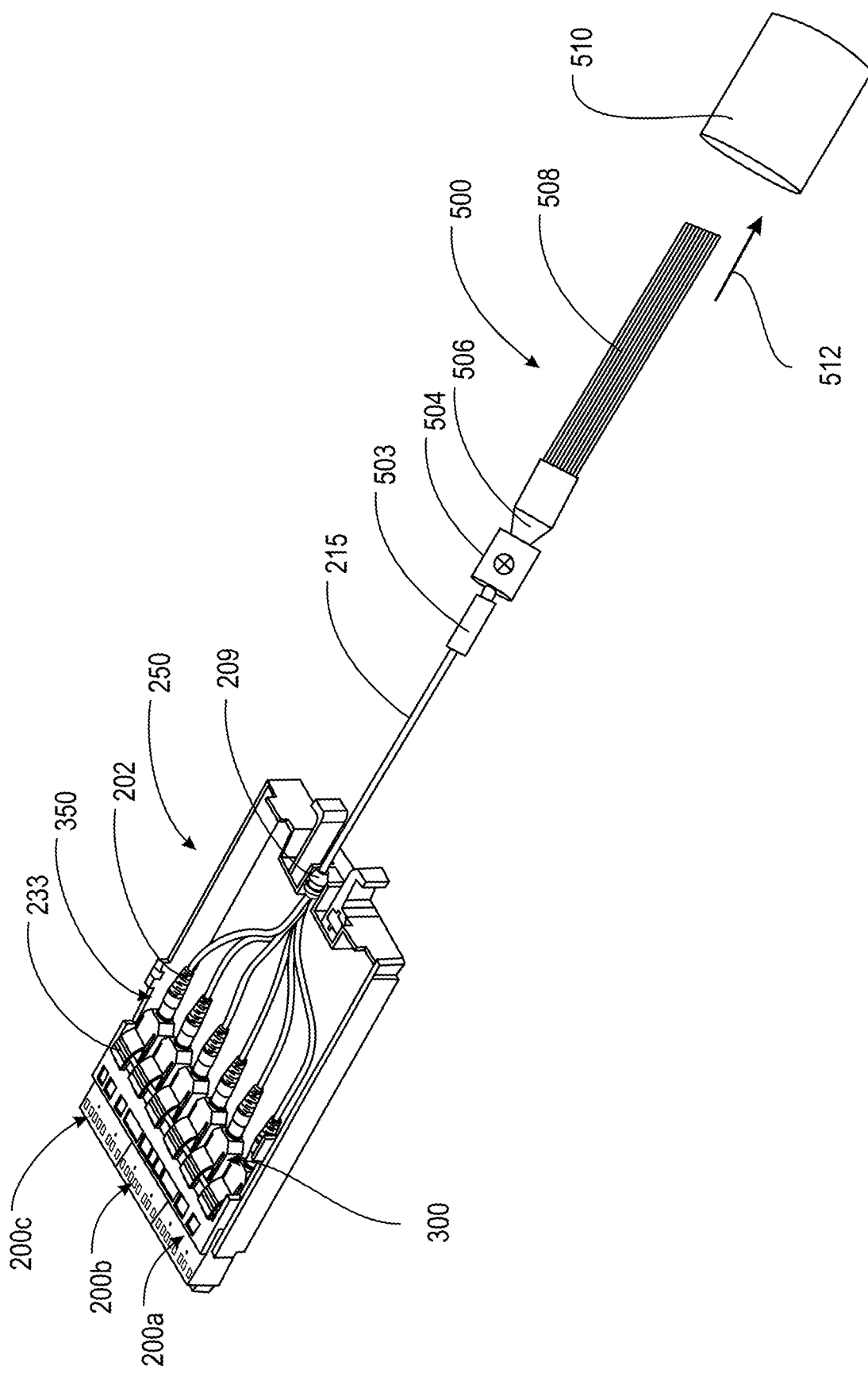
FIG. 5 depicts a portion of a cable connection structure having a ribbon cable in connection with a plurality of fiber optic connectors according to aspects of the disclosure.

FIG. 5 depicts the plurality of fiber optic connectors 300 in connection with a cable connection structure 500 (partly shown) that may be further in connection with another set of fiber optic connectors 514 (as shown in FIGS. 6A-6B and 7A-7C). The cable connection structure 500 has a first end including the ribbon cable 215 connected through a fiber cable clamp 504. A ribbon cable collector 503 may be utilized to facilitate collection of the ribbon cable 215 to be in connection with the fiber cable clamp 504. The fiber cable clamp 504 may further connect the ribbon cable 215 to a plurality of connecting cables 508 through a cable sorter 506. In one example, the fiber cable clamp 504 is removable from the ribbon cable collector 503 as needed. The plurality of connecting cables 508 may further be in connection with another set of fiber optic connectors 514, which will be further described below with reference to FIGS. 6A-6B and 7A-7C. The fiber cable clamp 504 may facilitate connection or separation of the ribbon cable 215 to the plurality of connecting cables 508, or vice versa. The length of the ribbon cable 215 may be adjusted, altered, or varied based on the different connection requirements among different fiber optic modules 250 located at different patch panel assemblies. A connection tube 510 may be utilized to enclose the plurality of connecting cables 508 therein for protection during transportation or installation.

Figures 6A, 6B:
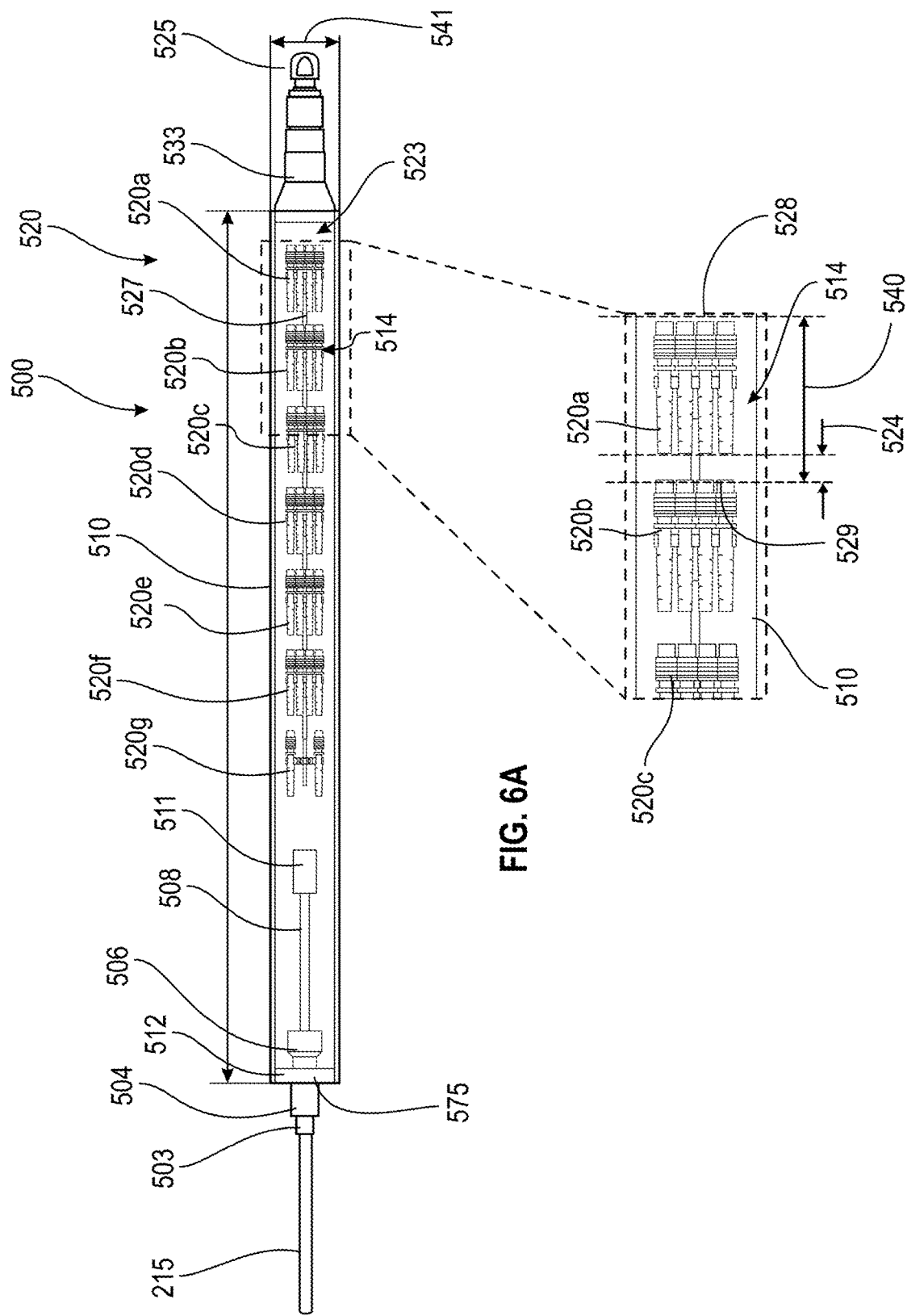
FIGS. 6A-6B depict a perspective view of a cable connection structure according to aspects of the disclosure.

FIGS. 6A-6B depict the cable connection structure 500 in a horizontal configuration that includes the connection tube 510 enclosing one or more connector sets 520 therein. The connection tube 510 has a cylindrical structure having a center opening 523 configured to enclose the one or more connector sets 520 in the cable connection structure 500. The connector set 520 may include a plurality of fiber optic connectors 514. The connection tube 510 may be removable and movable from the cable connection structure 500 to facilitate placement of the connector sets 520 inside the center opening 523 of the connection tube 510. The connection tube 510 may have an inside diameter between about 40 mm and about 150 mm while an outside diameter 541 between about 50 mm and about 180 mm A front cap 533 is removably coupled to a front end of the connection tube 510 to cover the center opening 523 of the connection tube 510 therein. A gripper 525 may be formed on the front cap 533 that allows fingers or mechanical robots to grab on as needed to facilitate transportation or installation. An end cap 512 is also removably coupled to a back end of the connection tube 510. The end cap 512 may have a through hole 575 that allows the cable sorter 506 to plunge therethrough to provide a connection of the ribbon cable 215 to the plurality of connecting cables 508 disposed in the connection tube 510. It is noted that although the fiber optic connectors 514 depicted in FIGS. 6A-9 are MPO connectors, other suitable types of the connectors, such as the connectors 300, for example LC connectors, may also be disposed on the connection tube 510, which will be further discussed below with reference to FIGS. 10-13 and 16.

Each connector set 520 may include the plurality of fiber optic connectors 514. Although seven connector sets 520 (shown as 520a, 520b, 520c, 520d, 520e, 520f, 520g) are shown in the cable connection structure 500 as depicted in FIG. 6A, it is noted that the connector sets 514 disposed in the cable connection structure 500 may be in any numbers as needed. In one example, each of the one or more connector sets 520 may be connected to a center support 527. The center support 527 may assist positioning the connector sets 520 in a linear fashion with a predetermined distance 524 spaced apart therebetween to avoid undesired twists or tangles. The center support 527 may assist securing each connector set 520 at a predetermined position along the longitudinal axis of the center support 527 so as to maximize space utilization enclosed in the connection tube 510. In one example, a first top 528 of the first connector set 520a to a second top 529 of the second connector set 520b is controlled at a distance 540 between about 40 mm and about 120 mm, such as between about 60 mm and about 100 mm, as shown in the magnified view in FIG. 6B.

Each fiber optic connector 514 from the connector set 520 has a corresponding cable coupled thereto. All of cables may then be collected and bundled together by a cable holder 511 and longitudinally extended to the cable sorter 506 to further be in connection with the ribbon cable 215 clamped through the fiber cable clamp 504.

Figure 7C:
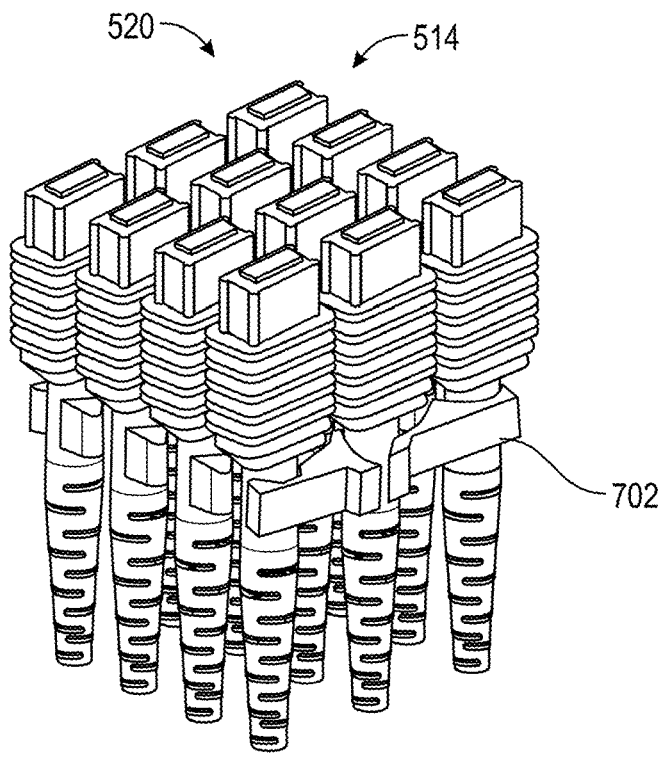

FIGS. 7A-7C depict a portion of the cable connection structure 500 including the connection tube 510. In the example depicted in FIGS. 7A-7C, the corresponding connecting cables connected to each of the fiber optic connectors 514 are not shown. In the example depicted in FIG. 7A, the connection tube 510 is placed in a vertical configuration. The connection tube 510 encloses one or more connector sets 520 therein. Each of the connector set (shown as 520a, 520b, 520c, 520d, 520e, 520f, 520f) is coupled to the center support 527 as shown in FIG. 7B. It is noted that the connection tube 510 is removed and not shown in FIG. 7B for ease of illustration. A connector holder 702 may be utilized in each connector set 520 to help hold each of the fiber optic connectors 514 in its designated slot. Details of the connector holder 702 will be further described below with reference to FIGS. 8 and 9. The fiber optic connectors 514 may be positioned and arranged in an array, such as three arrays as shown in FIG. 7C, or other suitable configurations that may possibly save most of the space to maintain the connector set 520 compact so as to allow an easy insertion of the connector set 520 into the connection tube 510. The center support 527 may be penetrated through a center opening defined in the connector holder 702 to connect the connector holders 702 axially in the center support 527. Alternatively, the center support 527 may be formed as an integrated body, such as an integral piece, connecting with at least one of the connector holders 702 to facilitate coupling the connector holder 702 to the center support 527. As shown in the magnified view of one of the example connector set 520 in FIG. 7C, the connector holder 702 holds twelves fiber optic connectors 514 and has twelves slots formed therein to hold each fiber optic connector 514 in place individually. It is noted that upon installation, the arrays of the fiber optic connectors 514 may be dissembled from the stacking-up-configuration so as to arrange each of the fiber optic connector 514 in a side by side configuration, such as the side by side configuration depicted in FIG. 3C, for placement into the fiber optic module 250.

Figure 8:
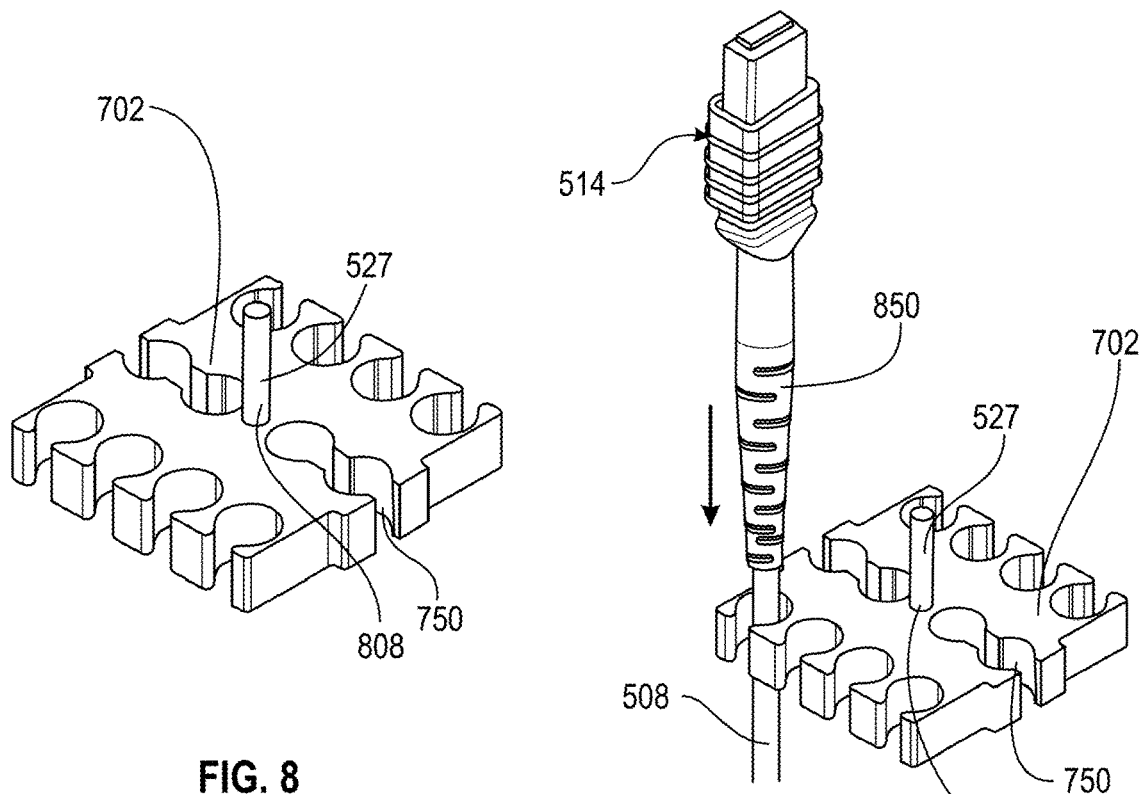
FIG. 8 depicts a connector holder configured to secure positions of fiber optic connectors disposed therein according to aspects of the disclosure.
Figure 9:
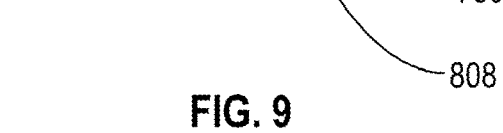
FIG. 9 depicts an example of a fiber optic connector placed in the connector holder of FIG. 8 according to aspects of the disclosure.

FIG. 8 depicts a perspective view of the connector holder 702 that has a plurality of slots 750 formed therein. FIG. 9 depicts the example fiber optic connectors 514 being inserted into the slot 750 depicted in the connector holder 702. The connector holder 702 may have a center opening 808 that allows the center support 527 to pass therethrough. In one example, the diameter of the slot 750 may be configured to accommodate different sizes of the fiber optic connectors 514 to be inserted therein. In one example, the diameter of the slot 750 is configured to be larger than the diameter of the connecting cable 508 that allows the cable 508 to pass therethrough, while smaller than a root portion 850 of the fiber optic connector 514 where the connecting cable 508 is connected to. By doing so, the root portion 850 of the fiber optic connector 514 may be held on and secured in the connector holder 702 that allows the connecting cable 508 connected thereunder to be sorted and collected in an organized manner to better manage the connect sets 514 in the connection tube 510.

Figure 10:
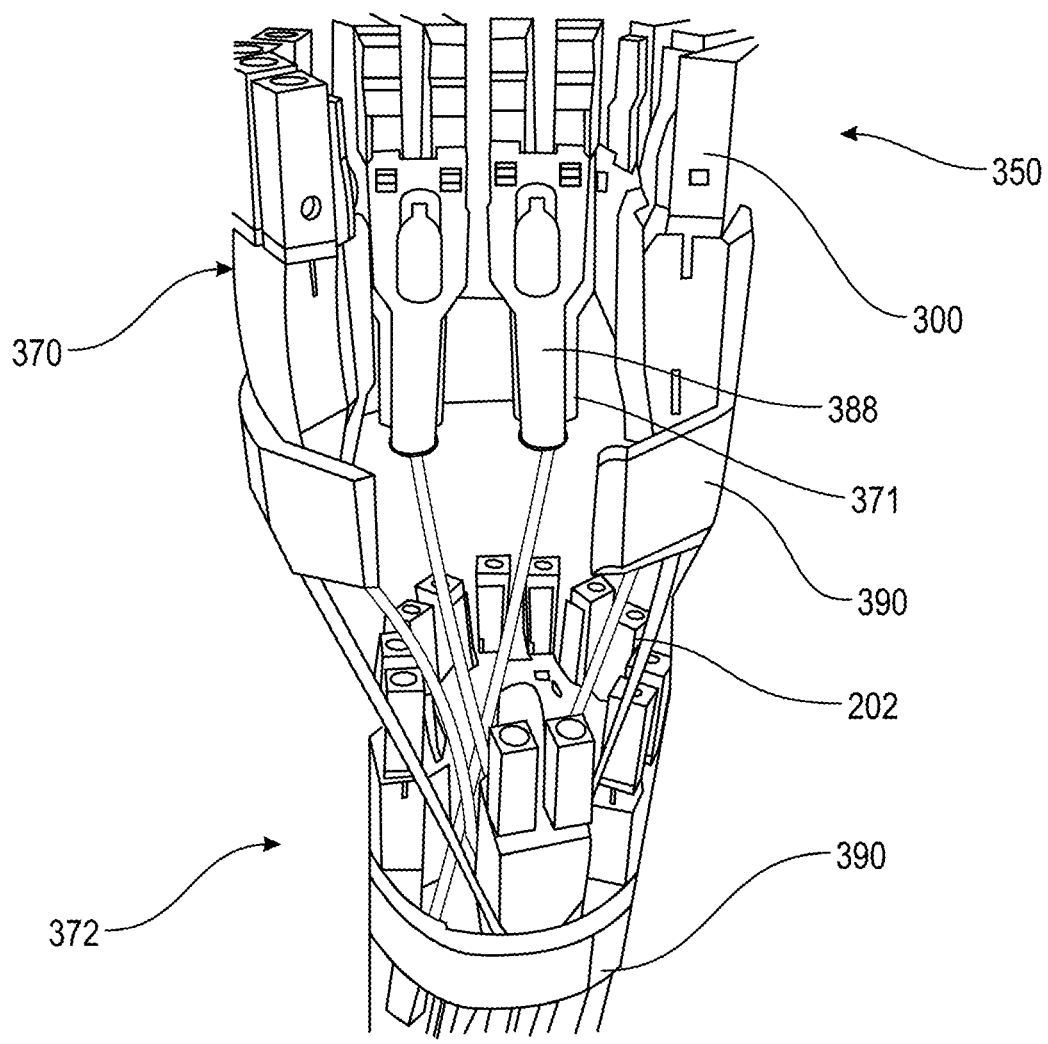
FIG. 10 depicts another example of a plurality of fiber optic connectors placed in a connector holder ring according to aspects of the disclosure.
Figure 11:
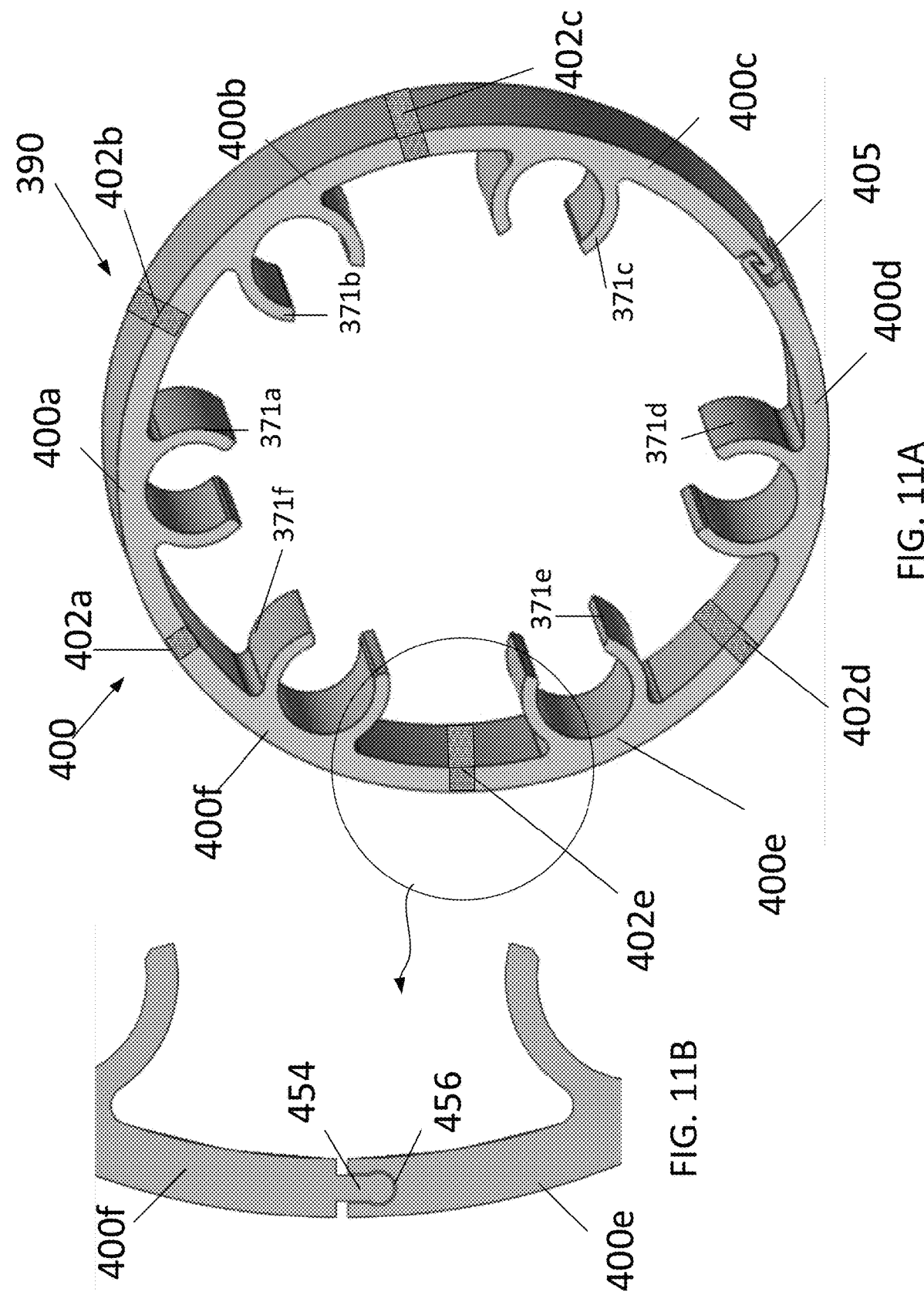
FIGS. 11A and 11B depict the connector holder ring depicted in FIG. 10 according to aspects of the disclosure.

FIG. 10 depicts another example of the plurality of fiber optic connectors 300 placed in a connector holder ring 390 according to aspects of the disclosure. The connector set 350 may include the plurality of fiber optic connectors 300 bundled or held by the connector holder ring 390. In the example depicted in FIG. 10, two connector sets 350 are shown with the two connector holder rings 390 respectively so that the first connector set 350 may be positioned in a first row 370 spaced apart from the second connector set positioned in a second row 372. Each fiber optic connector 300 includes a root portion 388 configured to rest on a clip 371 formed in an interior surface or a periphery region of the connector holder ring 390. Each clip 371 formed in the connector holder ring 390 is configured to hold one fiber optic connector 300. Thus, the number of the clips 371 formed in the connector holder ring 390 matches the number of the fiber optic connector 300 that may be bundled or held by the connector holder ring 390 when each of the clip 371 has a respective fiber optic connector 300 placed therein. In the example depicted in FIG. 10, the connector holder ring 390 located in the first row 370 is released in an open configuration that allows access of the fiber optic connectors 300 to be placed therein. In contrast, the connector holder ring 390 located in the second row 372 is locked in a close configuration once the desired number of the fiber optic connectors 300 is placed in the connector holder ring 390 and bundled therein.

FIGS. 11A and 11B depict the connector holder ring 390 of FIG. 10 according to aspects of the disclosure. In one example, the connector holder ring 390 includes a plurality of segments 400 (also shown as 400a, 400b, 400c, 400d, 400e, 400f for each segment). In the example depicted in FIG. 11A, the connector holder ring 390 includes six segments 400a, 400b, 400c, 400d, 400e, 400f. The segments may be assembled to form the connector holder ring 390. During assembling, each segment 400a, 400b, 400c, 400d, 400e, 400f may be fastened to each other either by a fastening structure 402a, 402b, 402c, 402d, 402e or by an interlocking structure 405. In one example, each connector holder ring 390 may include at least one interlocking structure 405 that allows the connector holder ring 390 to be selectively in an open configuration or a closed configuration as needed. In one example, the interlocking structure 405 may be easily released by a gentle finger pinch to have the connector holder ring 390 at an open configuration when access is needed for the fiber optic connector 300 to be placed therein. Alternatively, the interlocking structure 405 may be locked to maintain the connector holder ring 390 at a close configuration when needed, such as the fiber optic connector 300 are already put in place or other situations.

As the connector holder ring 390 includes six segments 400a, 400b, 400c, 400d, 400e, 400f shown in the example depicted in FIG. 11A, five fastening structure 402a, 402b, 402c, 402d, 402e along with one interlocking structure 405 may in combination connect each segment 400a, 400b, 400c, 400d, 400e, 400f to form the connector holder ring 390.

Each segment 400f may have one end having a tab 454 to be received by an aperture 456 located at another end of the neighboring segment 400e, as shown in the magnified view of FIG. 11B, forming the fastening structure 402e for the segment connection. The tab 454 and the aperture 456 formed at two ends of the segments 400f, 400e, 400a, 400b allow the segments to be snap-fit to each other. Once the segments are assembled and fastened by the fastening structure, a relatively larger force, as compared to the finger pinch required to be applied to the interlocking structure 405, may be needed to disassemble the segments, thus providing a strong interconnection interface to secure positions of the segments. In one example, at least two segments, such as the segments 400c, 400d, of the segments 400a, 400b, 400c, 400d, 400e, 400f may have one end snap-fit to the neighboring segments 400b, 400e while with another end interlocked to each other. It is noted that the numbers of the fastening structure and the interlocking structure may be adjusted or altered as needed to accommodate different sizes, different needs or different materials of the connector holder ring 390 as needed. Thus, by utilizing two types of securing structures, such as the interlocking structure 405 and the fastening structure 402a, the segments may be easily assembled with an easy access point to allow the connector holder ring 390 in open or closed configurations as needed.

Figure 12:
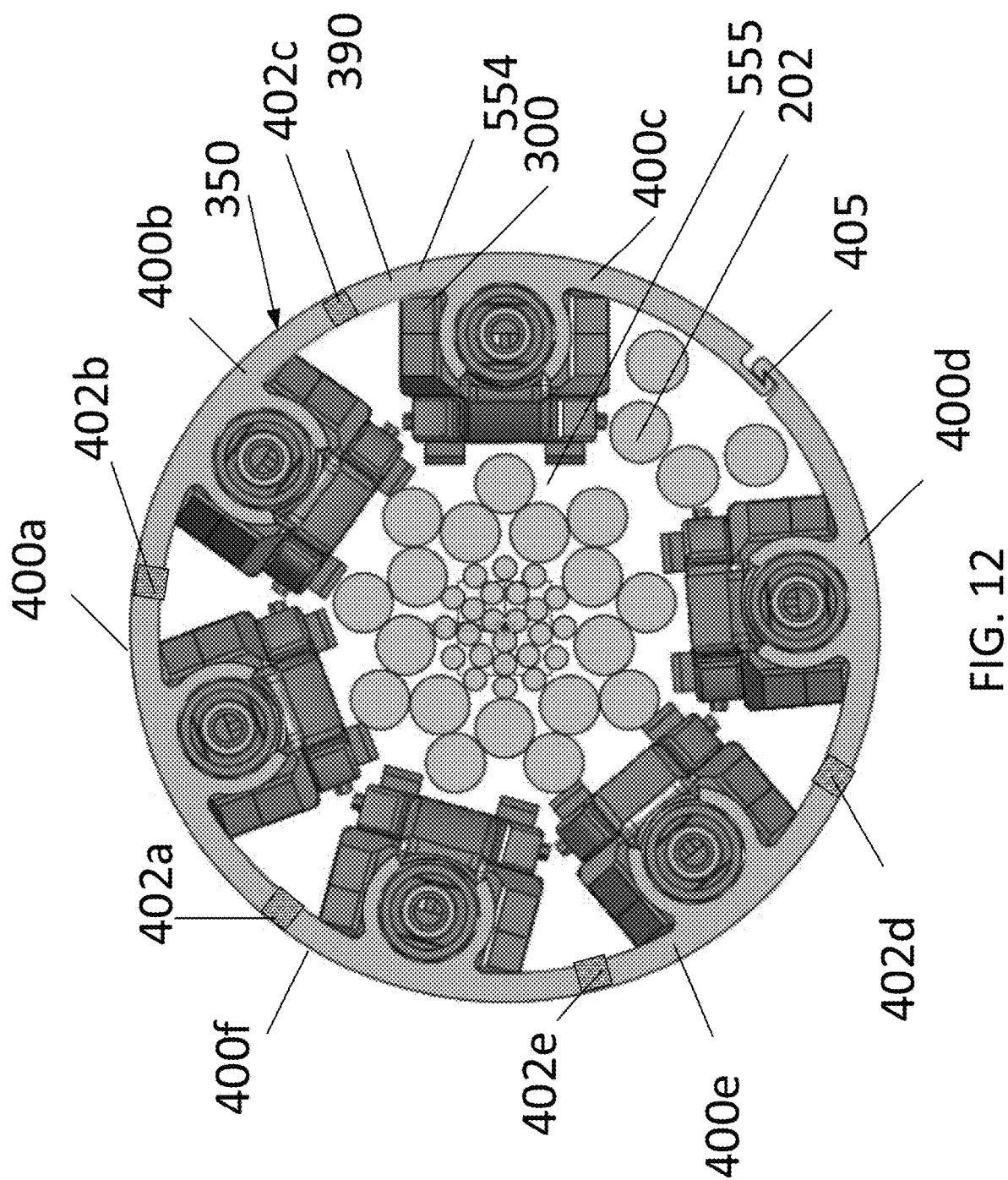
FIG. 12 depicts a cross sectional of the plurality of fiber optic connectors placed in the connector holder ring of FIG. 10 according to aspects of the disclosure.

FIG. 12 depicts a cross sectional view of the plurality of fiber optic connectors 300 placed in and held by the connector holder ring 390. The fiber optic connectors 300 are configured to be placed at a periphery region 554 of the connector holder ring 390 wherein the clips 371 (not viewable in FIG. 12) are located. In such configuration, the center opening 555 of the connector holder ring 390 may allow the connecting cables 202 to pass therethrough. Similarly, the center opening 555 may also allow a center support, such as the center support 527 depicted in FIG. 7B, to be passed therethrough so as to assist connecting multiple connector sets 350 to the center support as a center axis. It is noted that the dimension of the connector holder ring 390 may be varied based on the dimension of the fiber optic connectors 300 to be secured and/or inserted therein as needed Thus, when multiple arrays of the connector sets 350 are stacked in arrays or connected, the multiple connecting cables 202 connected from each of the fiber optic connectors 300 may be collected and primarily distributed in the center opening 555 of the connector holder ring 390, thus providing a relatively large space for connection cable storage and passage. Thus, the connector sets 350 positioned in the cable connection structure may be maintained at a compact size, such as having a diameter less than 50 mm, for example about 40 mm and about 49 mm By doing so, the cable connection structure may be manufactured in a relatively smaller size, such as less than 50 mm, so that the manufacturing cost may be saved and the weight of the cable connection structure 500 may be reduced.

Figure 13A:
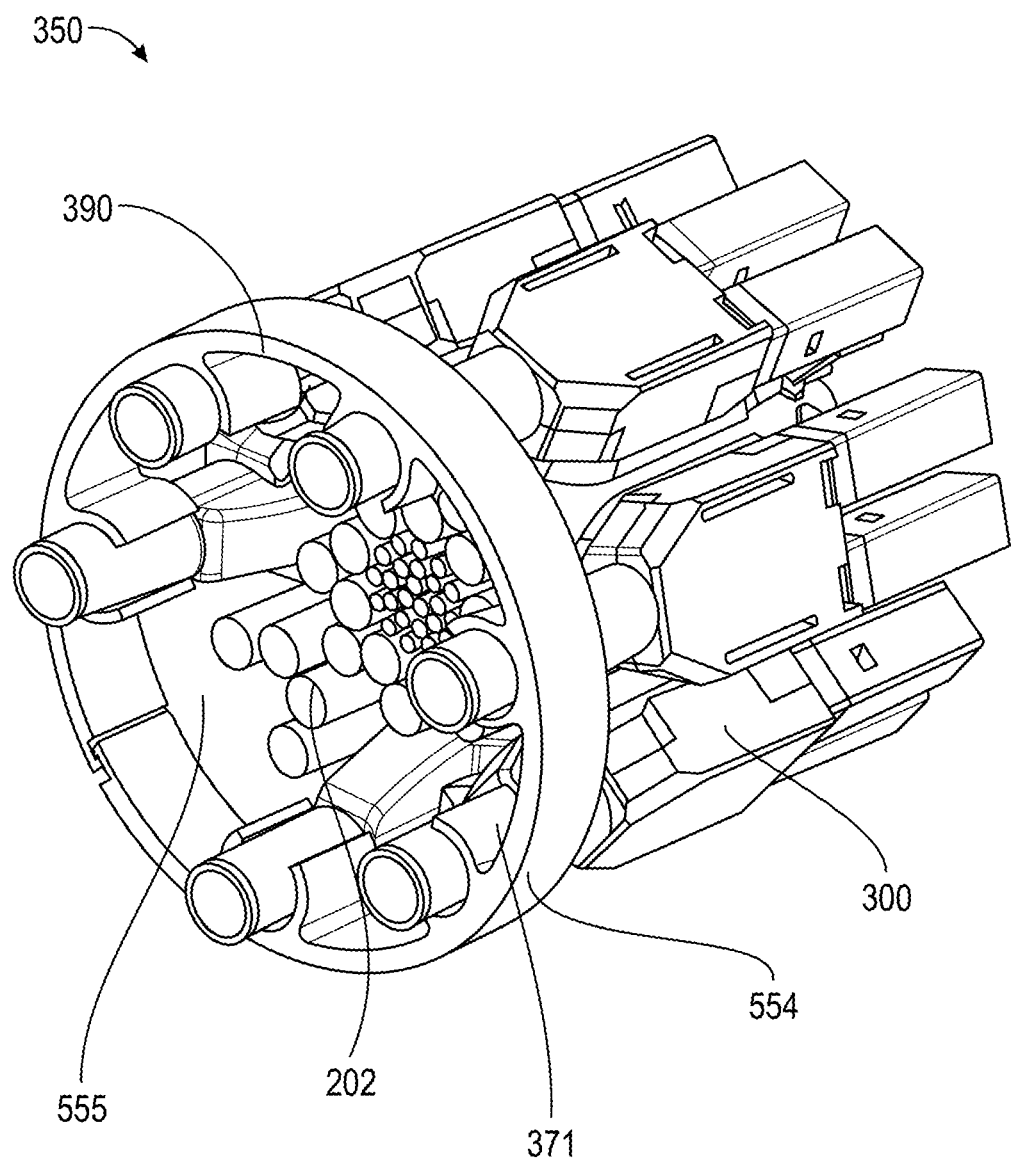
FIGS. 13A-13B depict a front perspective view and a rear perspective view of the plurality of fiber optic connectors placed in the connector holder ring of FIG. 10 according to aspects of the disclosure.
Figure 13B:
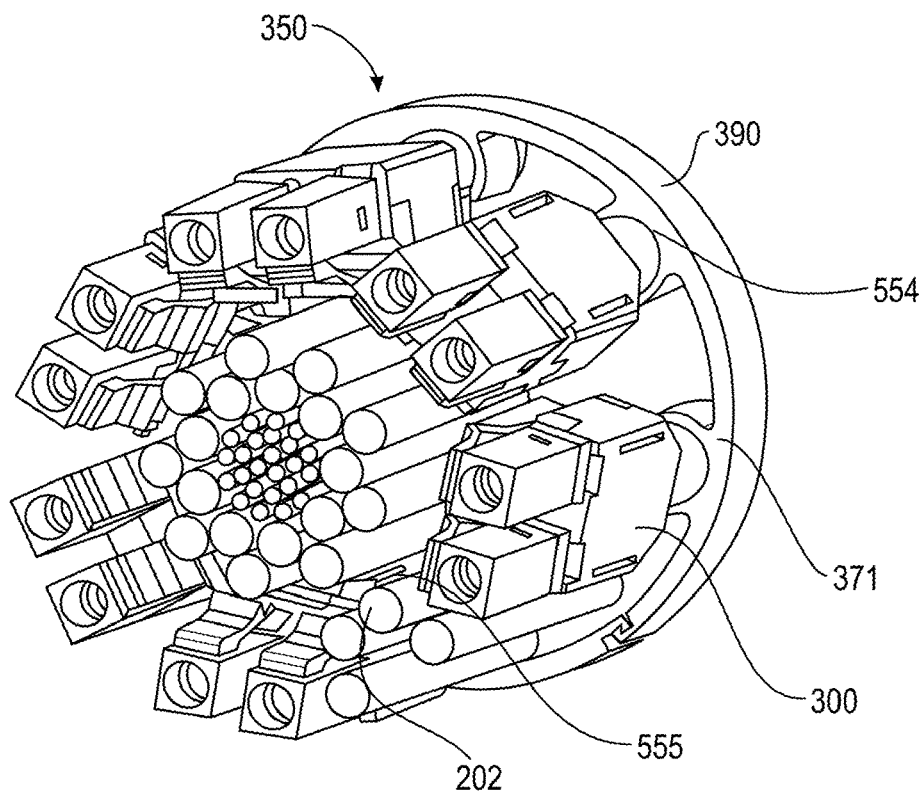

FIG. 13A-13B depict a front perspective view and a rear perspective view of the plurality of fiber optic connectors 300 placed in the connector holder ring 390 of FIG. 10. The connecting cables 202 are collected in the center opening 555 of the connector holder ring 390 while the clips 371 are located at the periphery region 554, such as the main body, of the connector holder ring 390.

Figure 14A:
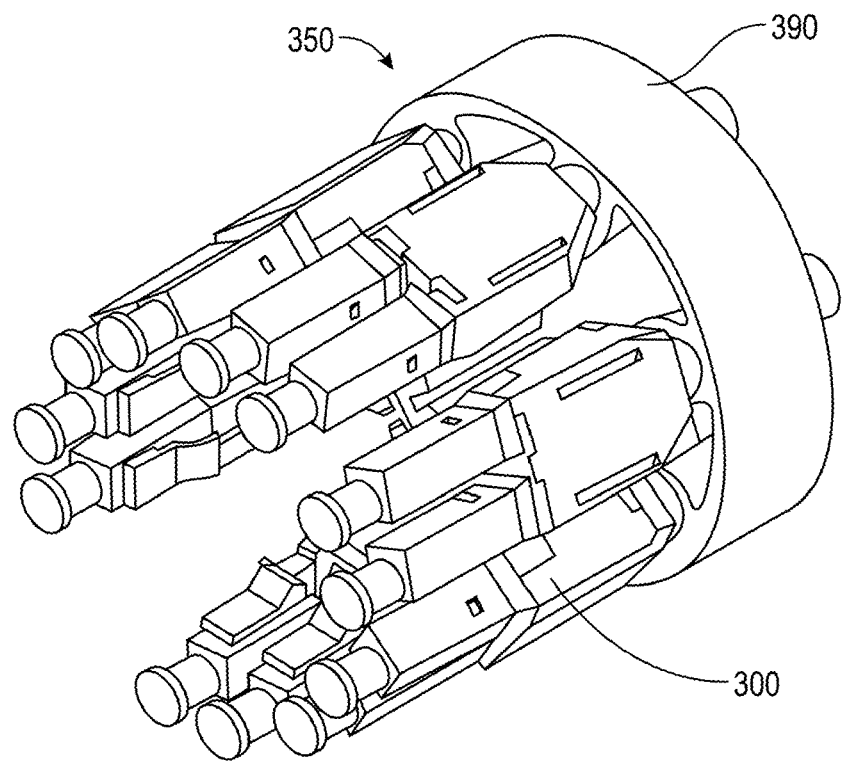
FIGS. 14A-14B depicts a perspective view and a cross sectional view of the fiber optic connectors 300 of FIGS. 13A-13B without connecting fibers connected according to aspects of the disclosure.
Figure 14B:
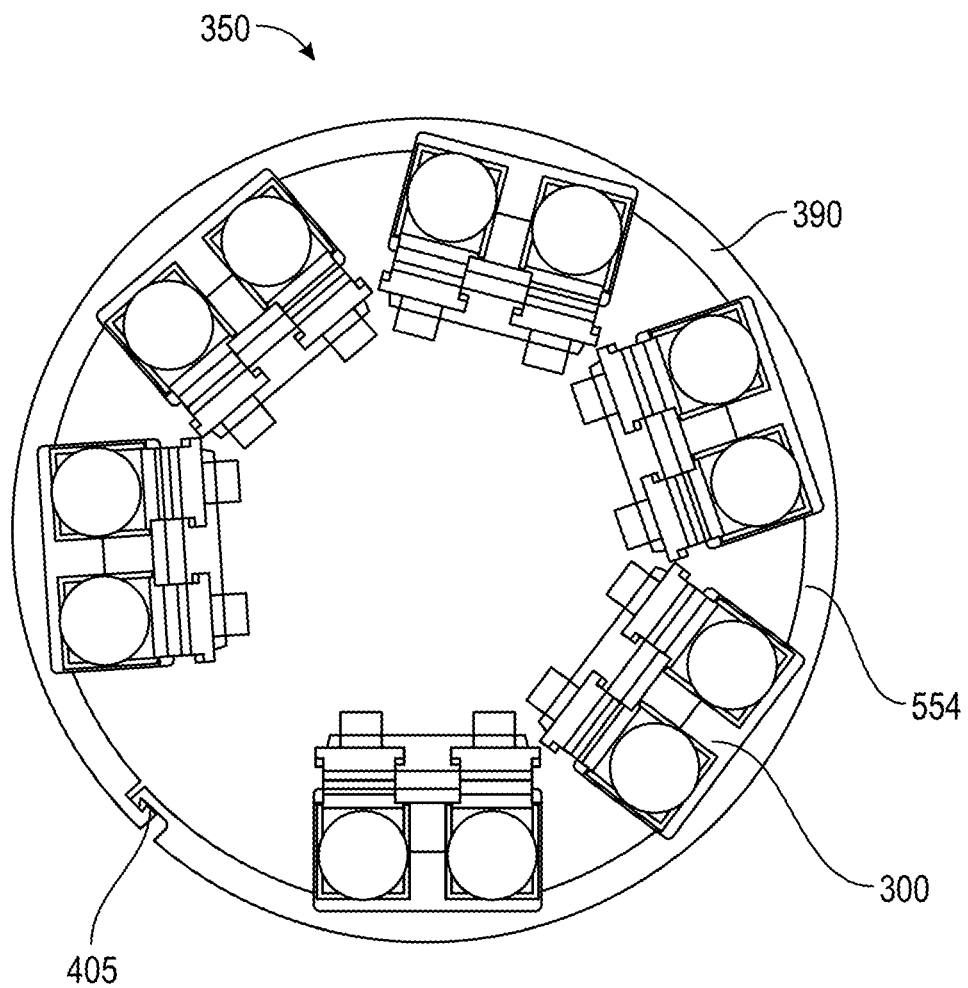

FIGS. 14A-14B depicts a perspective view and a cross sectional view of the fiber optic connectors 300 of FIGS. 13A-13B in the connector holder ring 390 without the connecting fibers 202 connected. As shown in FIGS. 14A-14b, the fiber optic connectors 300 are placed in the clips 371, which are located at the periphery region 554, such as the main body, of the connector holder ring 390.

Figures 15A, 15B:
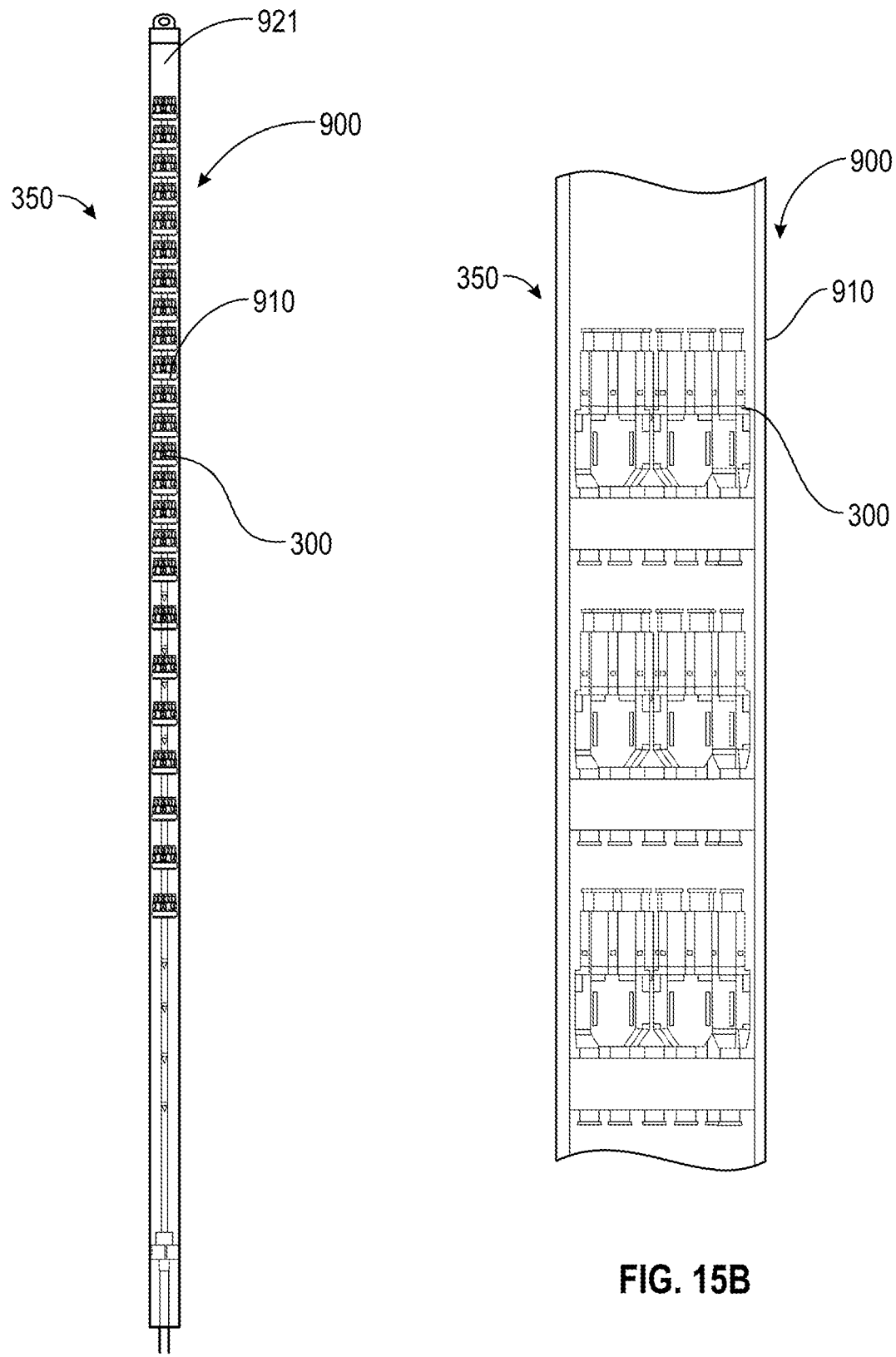
FIGS. 15A-15B depict a plurality of fiber optic connectors placed a cable connection structure according to aspects of the disclosure.

FIGS. 15A-15B depict the plurality of fiber optic connectors 300 of FIGS. 14A-14B placed in a cable connection structure 900 according to aspects of the disclosure. In the example depicted in FIGS. 15A-15B, the corresponding connecting cables connected to each of the fiber optic connectors 300 are not shown. In the example depicted in FIG. 15A, the connection tube 900 is placed in a vertical configuration. The connection tube 900 encloses one or more connector sets 300 therein. Each of the connector set 300 may be coupled to the center support (not shown). FIG. 15B depict a magnified view of a portion of the connection tube 900 of FIG. 15A. Similarly, the plurality of fiber optic connectors 300 in each connector set 300 is placed in the connection tube 900. Each connector set 300 may be positioned in the connection tube 900 in a spaced apart relationship having a predetermined distance away from each other. In the example depicted in FIGS. 15A-15B, the fiber optic connectors 300 as utilized are LC connectors.

As discussed above, as the fiber optic connectors 300 may be placed in the connector holder ring 390 in a relatively compact fashion, such as an outer dimeter 921 less than 50 mm, such as between about 40 mm and about 49 mm, as shown in FIG. 15A. An inner dimeter less than 46 mm, such as between about 38 mm and about 45 mm may be utilized to allow the fiber optic connectors 300 to be disposed therein. The fiber optic connectors 300 may be positioned and arranged in an array, such as three arrays as shown in FIG. 15B, or other suitable configurations that may possibly save most of the space to maintain the connector set 350 compact so as to allow an easy insertion of the connector set 350 into the connection tube 910. It is noted that upon installation, the arrays of the fiber optic connectors 300 may be dissembled from the stacking-up-configuration so as to arrange each of the fiber optic connector 300 in a side by side configuration, such as the side by side configuration depicted in FIG. 3C, for placement into the fiber optic module 250.

Figure 16:
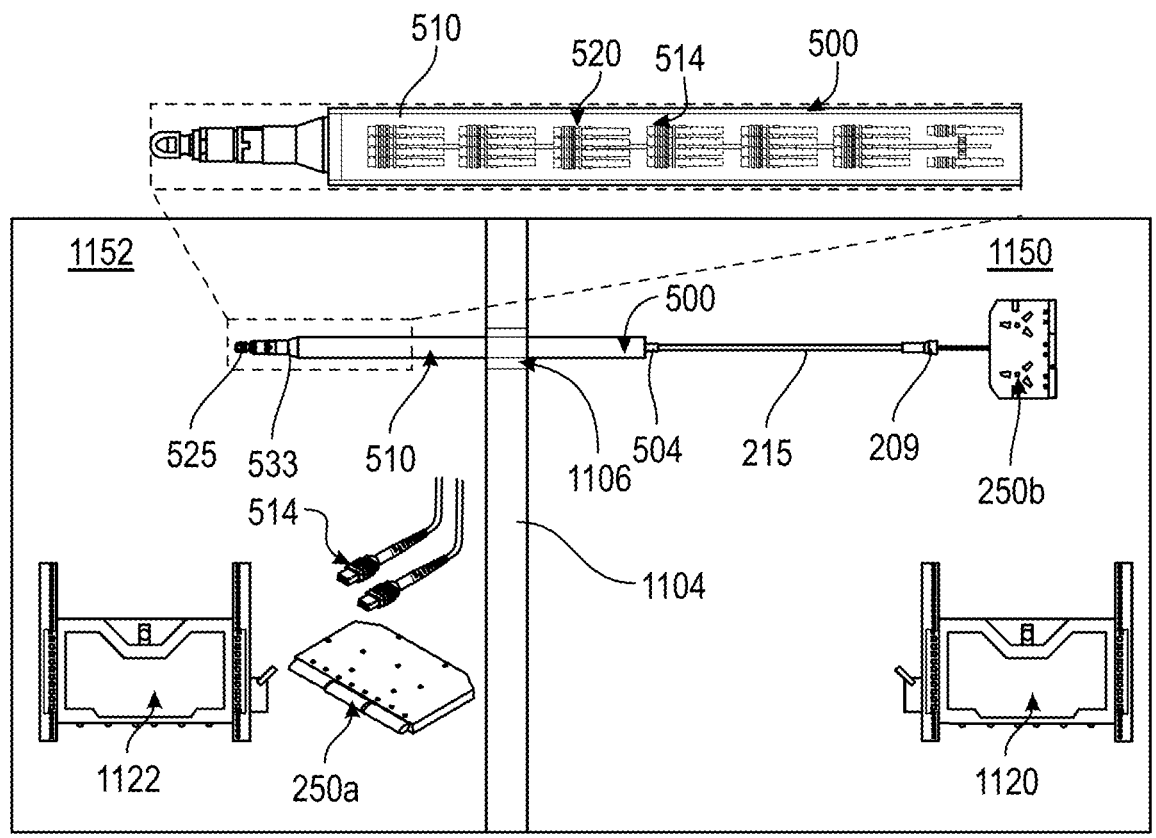
FIG. 16 depicts an example of a cable connection structure connecting fiber optic modules positioned in patch panel assemblies.

FIG. 16 depicts an example of the cable connection structure 500 upon installation. The cable connection structure 500 may facilitate connection between patch panel assemblies 1120, 1122 located at different locations, such as a first room 1150 and a second room 1152. In some examples, the first room 1150 may be a server room and the second room 1152 may be a data center room, or vice versa. It is noted that the first and the second rooms 1150, 1152 may be any suitable locations that utilize fiber optic hardware for data connection and/or transmission. As the cable connection structure 500 may provide a direct connection between the panel assemblies 1120, 1122 located at different rooms 1150, 1152, a conventional splicing box, splicing enclosure or splicing structure may be eliminated as the cable connection structure 500 itself provides suitable types of cables and/or connectors for connection without the need of additional labor to rearrange or reconnect cables/connectors of different types. Thus, the cable connection structure 500 forgoes the conventional splicing box, splicing enclosure or splicing structure.

In the example depicted in FIG. 16, the cable connection structure 500 may pass through an opening 1106 formed in a wall 1104 to allow access of the cable connection structure 500 from the first room 1150 to the second room 1152. The length of the cable connection structure 500 may be varied by controlling different lengths of the ribbon cable 215 utilized in the cable connection structure 500 or different lengths of the connecting cables 508. For example, the ribbon cable 215 may be configured to have a length sufficiently long to connect the fiber optic connectors in the fiber optic module 250b positioned in the first patch panel assembly 1120 to the fiber optic connectors in the fiber optic module 250a positioned in the second patch panel assembly 1122.

The gripper 525 in the cable connection structure 500 may facilitate an operator, a technician, a robot to grab thereon and pull the cable connection structure 500 through the wall 1104 for connection. After the body of the connection tube 510 passes through the wall 1104, the connection tube 510 may then be removed, exposing the fiber optic connectors 514 enclosed therein for installation. The fiber optic connectors 514 may then be connected to the fiber optic module 250a, such as the example depicted in FIGS. 3A-3C, which will be later placed into the second patch panel assembly 1122. It is noted that the example of the fiber optic connectors 514 depicted in FIG. 16 is MPO connector, which is one of the examples that may be positioned in the cable connection structure 500.

Similarly, another set of the fiber optic connectors enclosed in the fiber optic module 250b may also be placed in the patch panel assembly 1120 located in another room 1150. The cable connection structure 500 provides a first end including a plurality of fiber optic connectors 514 and a second end including the ribbon cable 215 for connection among different connectors for proper data transmission. The first end including the plurality of fiber optic connectors 514 is enclosed and covered by the connection tube 510 for ease of transportation, installation and protection. It is noted that additional ribbon cable may be utilized between the cable collecting connector 209 and the fiber cable clamp 504 so as to adjust the length of the cable connection structure 500 to facilitate connection between the patch panel assemblies 1120, 1122 with diverse distances as needed.

Figure 17:
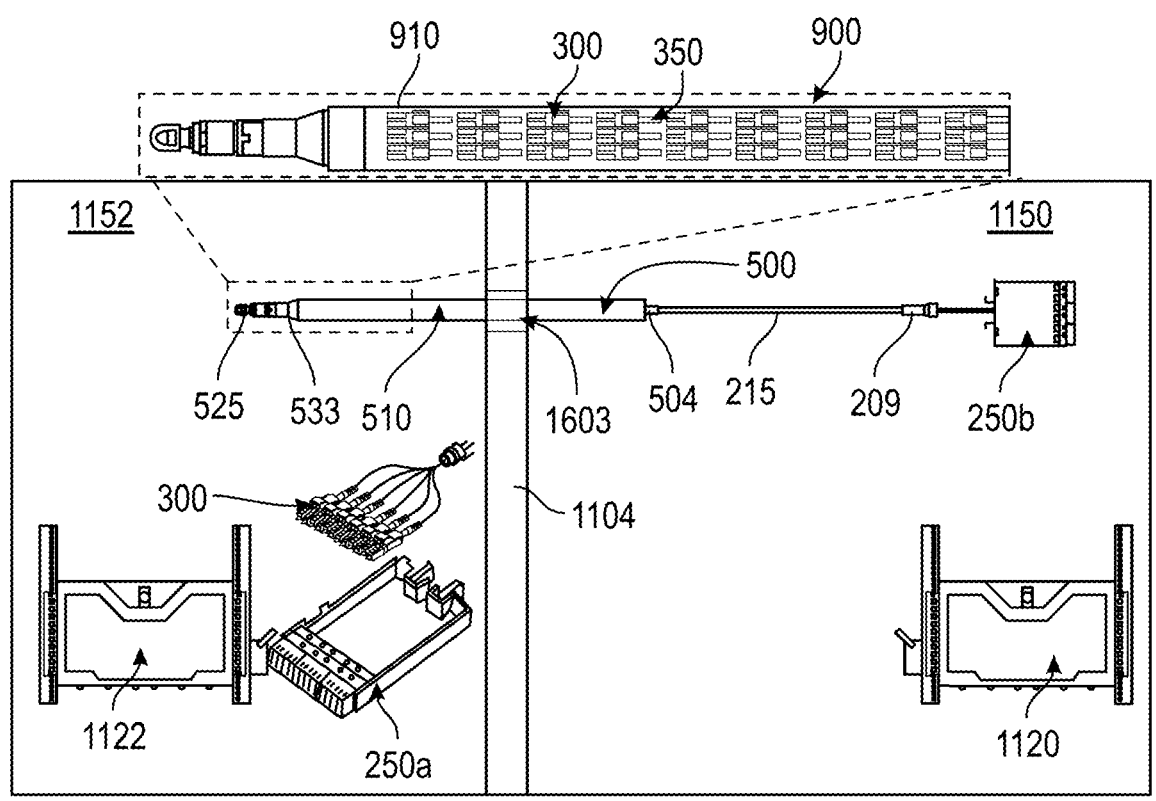
FIG. 17 depicts another example of a cable connection structure connecting fiber optic modules positioned in patch panel assemblies.

FIG. 17 depicts another example of a cable connection structure 900 upon installation. The cable connection structure 900 is substantially similar or the same as the cable connection structure 500 described above with reference to FIG. 16, except that the fiber optic connectors 300 disposed in the cable connection structure 900 are LC connectors. As discussed above, as the connector holder ring 390 is utilized to hold the fiber optic connectors 300 in a relatively compact dimension, the connection tube 910 utilized in the cable connection structure 900 may have a relatively smaller diameter, such as less than 50 mm, such as between about 40 mm and about 49 mm. The compact size allows the hole 1603 drilled in the wall 1104 to have a relatively smaller dimension as well so as to save manufacturing and installation cost. The complexity of installation may also be reduced.

Figure 18:
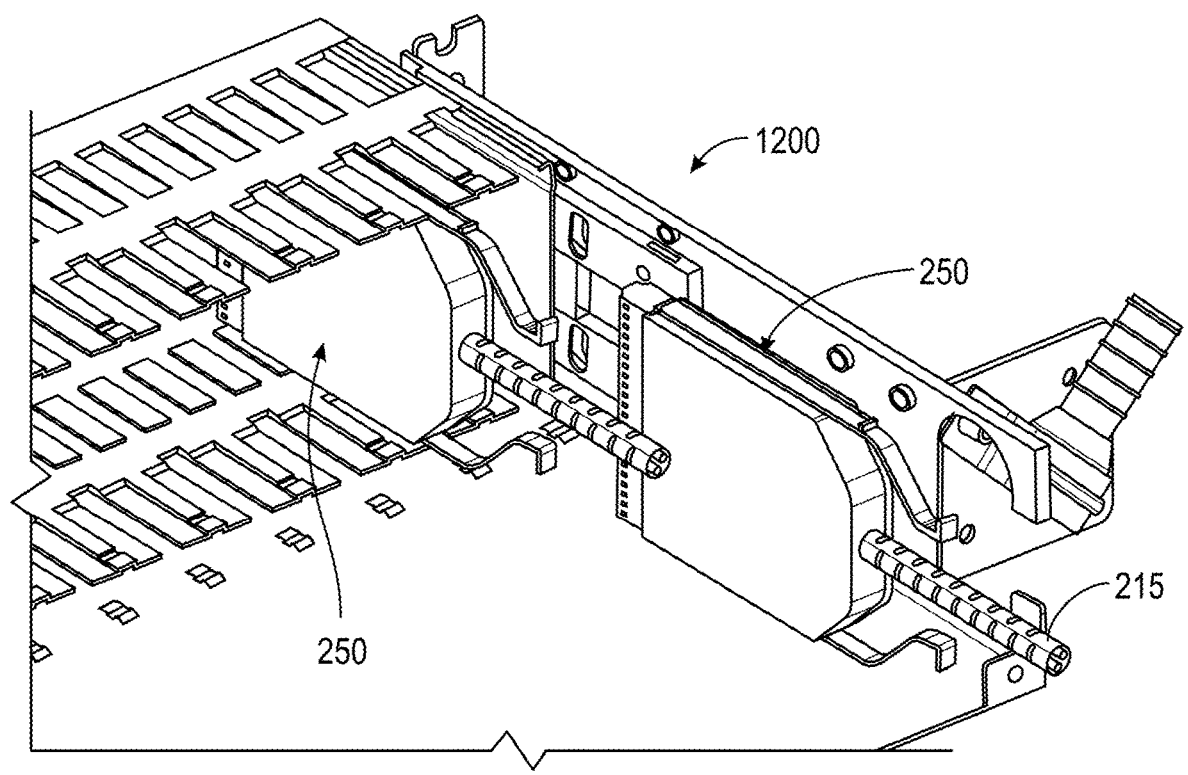
FIG. 18 depicts an end view of an example of a fiber optic module positioned in a patch panel assembly according to aspects of the disclosure.

FIG. 18 depicts an example of a rear end view of the fiber optic module 250 placed in a patch panel assembly 1200, similar to or the same as the patch panel assembles 1120, 1122 depicted in FIGS. 16-17. As discussed above, the multiple fiber optic connectors 514, 300 may be enclosed in the fiber optic module 250 with the ribbon cable 215 exposed for connection. The fiber optic module 250 may then be positioned and loaded in a slot defined in the patch panel assembly 1200.

Figure 19:
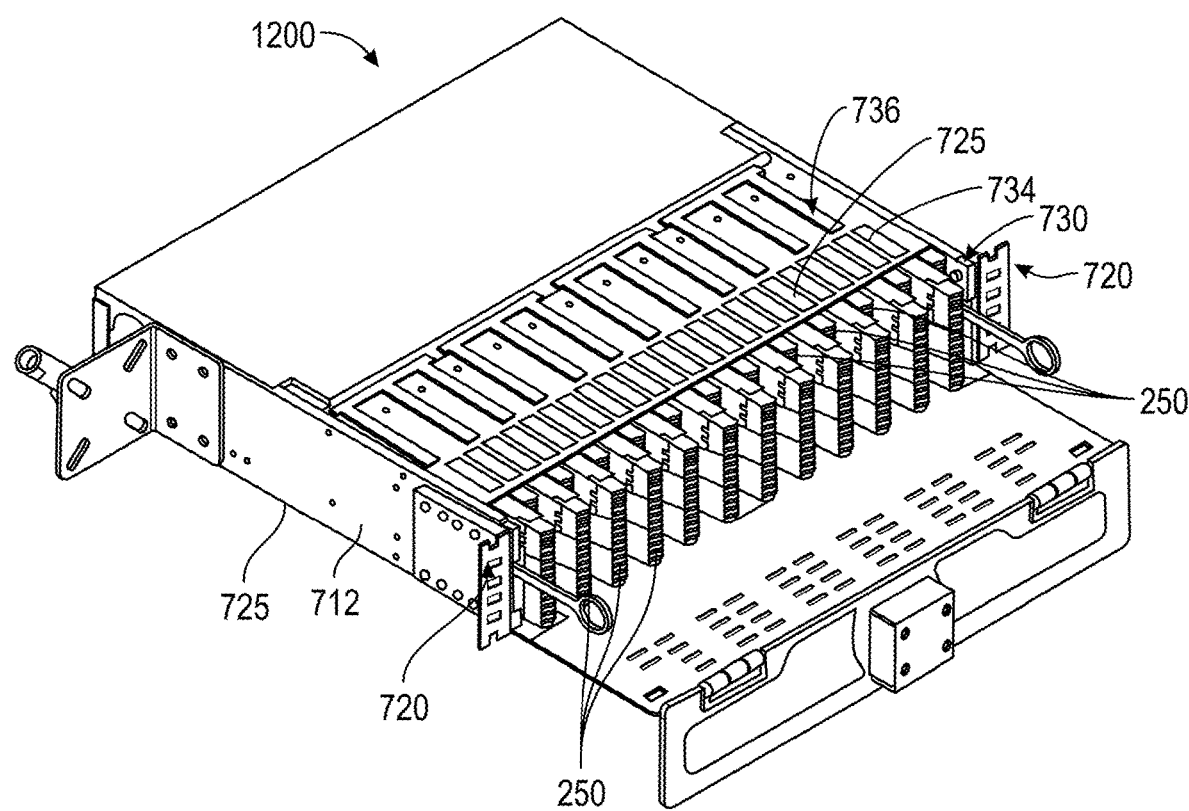
FIG. 19 depicts a front view of an example of a fiber optic module positioned in a patch panel assembly according to aspects of the disclosure.

FIG. 19 depicts an example of a front end view of the fiber optic module 250 placed in the patch panel assembly 1200 with a top front cover 725 installed and covered thereon. The fiber optic module 250 may be disposed in an interior region defined in the patch panel assembly 1200. The fiber optic module 250 is disposed vertically in the interior region relative to a horizontal plane defined by the top front cover 725 or a bottom cover 727 of the patch panel assembly 1200. A mounting structure 720 may be disposed on side panels 712, 714 that can assist mounting the patch panel assembly 1200 to a cable management system, such as a cable rack located in the server room or a data center, such as the first and the second rooms 1150, 1152 depicted in FIGS. 16-17.

A sliding (or extendable) tray 736 may be mounted in the patch panel assembly 1200. The sliding tray 736 may carry a plurality of fiber optic modules 250 so as to slide or pull a predetermined set of the fiber optic module 250 outwardly relative to the patch panel assembly 1200. Although the example depicted in FIG. 18 has a set of fiber optic module 250 slightly protruded outward from another set of optic module 250, such as in a staggered configuration, it is noted that the fiber optic modules 250 positioned and loaded in the patch panel assembly 1200 may be in any configurations as needed.

Figure 20:
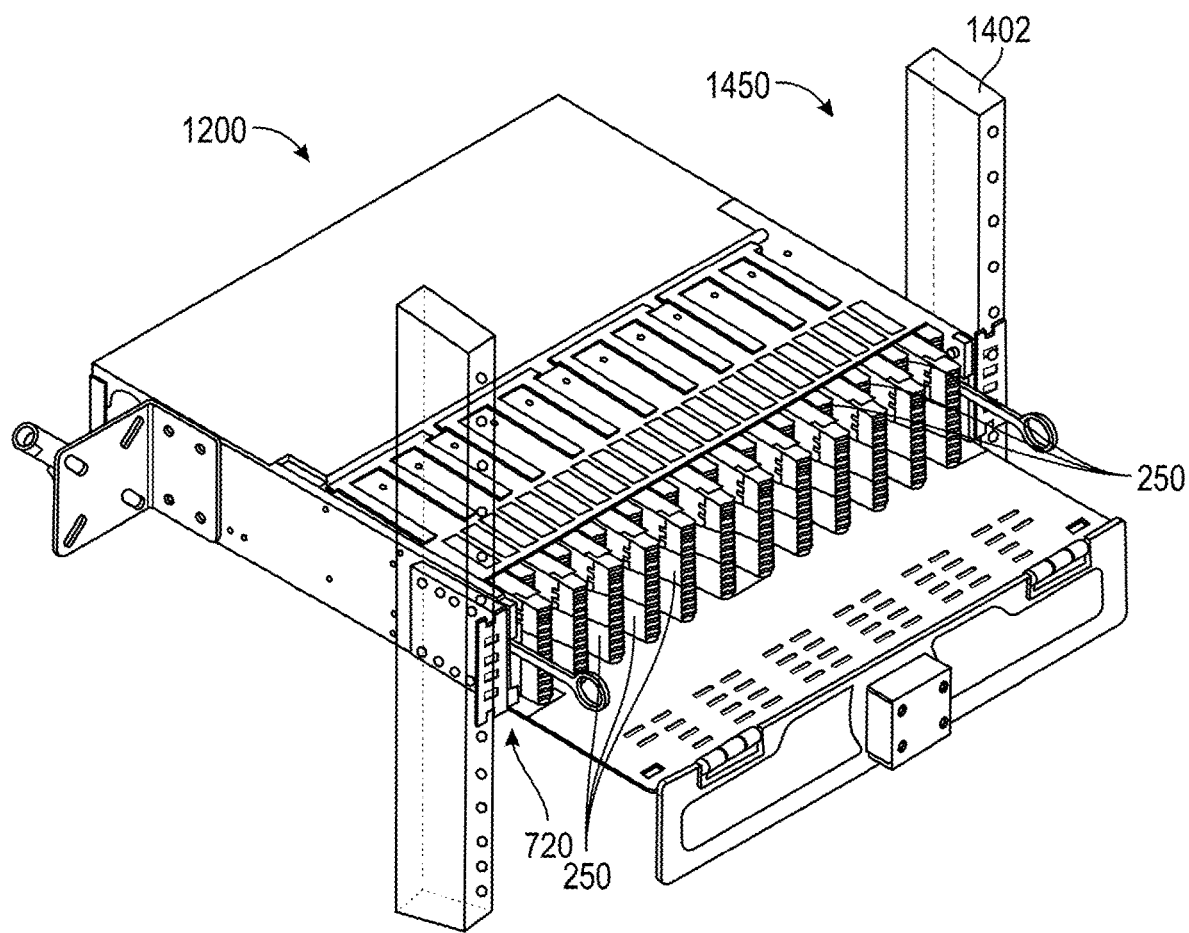
FIG. 20 depicts an example of a patch panel assembly mounted in a cable management rack according to aspects of the disclosure.

FIG. 20 depicts an example fiber optic cable management system 1450 that may have the patch panel assembly 1200 of FIG. 19, or the patch panel assembles 1120, 1122 depicted in FIGS. 16-17 to be mounted on a rack 1402. After the plurality of fiber optic modules 250 are disposed in the patch panel assembly 1200, the patch panel assembly 1200 may then be mounted on the rack 1402 by fastening features, such as bolts, nuts or fastening screws. The rack 1402 may allow multiple patch panel assemblies 1200 mounted thereon in the fiber optic cable management system 1450.

Figure 21:
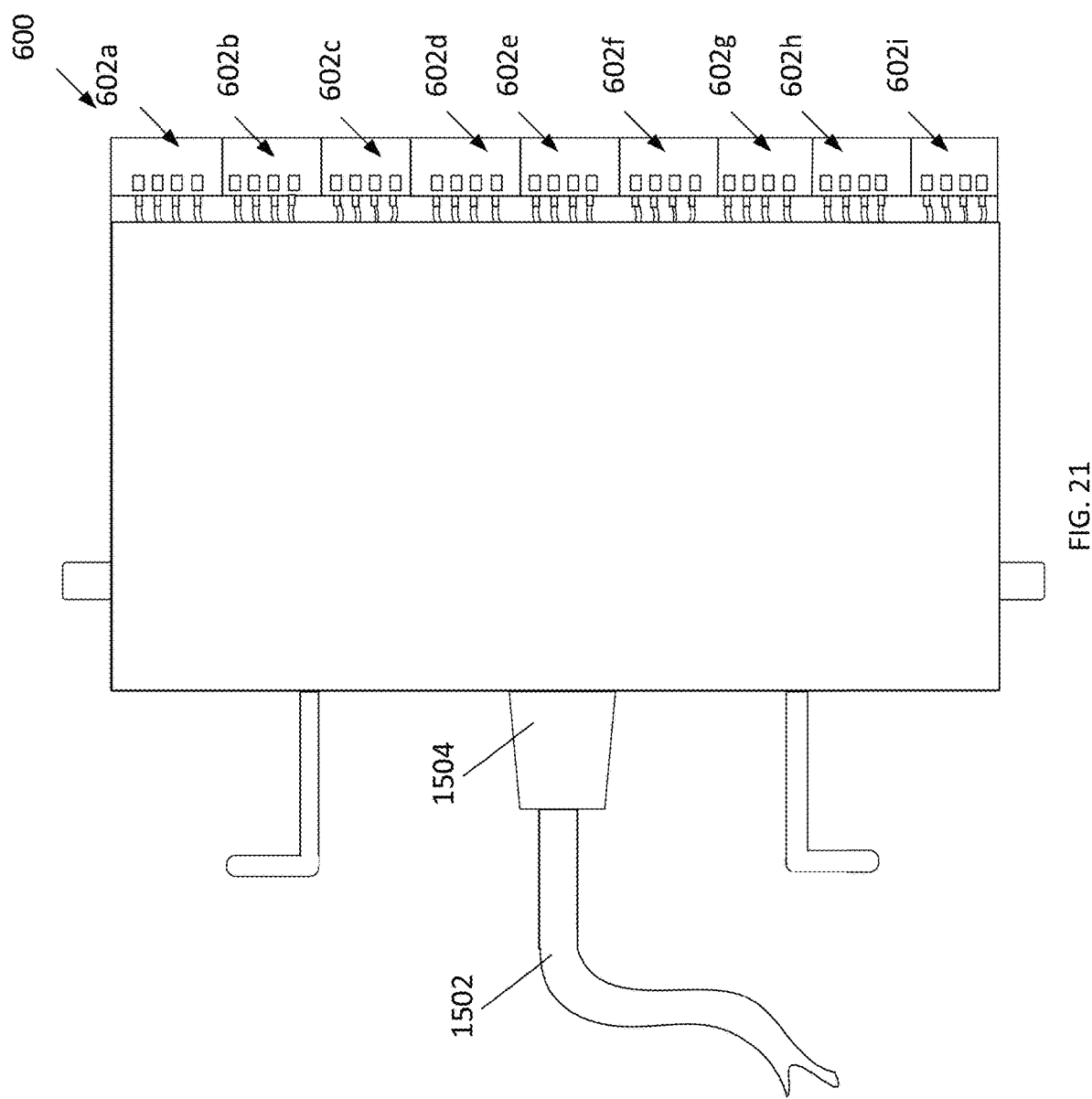
FIG. 21 depicts another example of a fiber optic module according to aspects of the disclosure.

FIG. 21 depicts another example of a fiber optic module 600 with different dimensions that may accommodate connection of additional fiber optic connectors. Multiple adaptor modules 602*a*, 602*b*. 602*c*, 602*d*, 602*e*, 602*f*, 602*g*, 602*h*, 602*i*, similar to the adaptor module 200*a*, 200*b*, 200*c* described above, may be installed and utilized in the fiber optic module 600 to facilitate connection of fiber optic connectors with a desired large number, so as to form a high density fiber optic module 600. Similarly, the cables connected to the fiber optic connectors in the adaptor modules 602*a*, 602*b*. 602*c*, 602*d*, 602*e*, 602*f*, 602*g*, 602*h*, 602*i* may be connected and formed as a ribbon cable 1502 collected by a cable collecting connector 1504 for further connection. It is noted that when the high density fiber optic module 600 of FIG. 21 is configured to be installed in the patch panel assembly 1200, the dimension of the patch panel assembly 1200 may be proportionally increased to accommodate the high density fiber optic module 600 of FIG. 21 with the larger dimension.

Thus, a cable connection structure for fiber optic hardware connection is provided. The cable connection structure may provide a direction connection among the cables and/or fiber optic connectors located in different patch panel assemblies from different locations. The cable connection structure may provide a direct cable connection of the fiber optic connectors from a first patch panel assembly in a first location, such as a server room, to a second patch panel located at a second location, such as a data center room. The cable connection structure 500 provides suitable types of cables and/or connector for connection from different patch panel assemblies so that additional labor to rearrange or reconnect cables/connectors of different types is not required or needed. Thus, by direct connection between the first and the second fiber optic modules located at different patch panels using the cable connection structure, the use of a conventional splicing structure/enclosure for fiber optic hardware connection may be eliminated, thus reducing installation cost, labor, and splicing time.

Unless otherwise stated, the foregoing alternative examples are not mutually exclusive, but may be implemented in various combinations to achieve unique advantages. As these and other variations and combinations of the features discussed above can be utilized without departing from the subject matter defined by the claims, the foregoing description should be taken by way of illustration rather than by way of limitation of the subject matter defined by the claims. In addition, the provision of the examples described herein, as well as clauses phrased as "such as," "including" and the like, should not be interpreted as limiting the subject matter of the claims to the specific examples; rather, the examples are intended to illustrate only one of many possible implementations. Further, the same reference numbers in different drawings can identify the same or similar elements.

The invention claimed is:

1. A cable connection structure, comprising:
   at least one connector set including a plurality of fiber optic connectors, wherein each of the fiber optic connectors has a corresponding connecting cable coupled thereto;
   a cable sorter having a first end connected to the connecting cable;
   a ribbon cable connected to a second end of the cable sorter through a fiber cable clamp;

a connection tube having a center opening that allows the connector set to be disposed therein; and an end cap removably coupled to a back end of the connection tube, wherein the end cap has a through hole that allows the cable sorter to pass therethrough.

2. The cable connection structure of claim 1, further comprising:

a ribbon cable collector disposed between the ribbon cable and the fiber cable clamp.

3. The cable connection structure of claim 1, wherein the fiber cable clamp is removable from the cable sorter.

4. The cable connection structure of claim 1, further comprising:

a center support, wherein the connector set is coupled to the center support.

5. The cable connection structure of claim 4, wherein the connector set is coupled to the center support through a connector holder or a connector holder ring.

6. The cable connection structure of claim 4, further comprising:

multiple connector sets coupled to the center support having a predetermined distance spaced away from each other.

7. The cable connection structure of claim 4, wherein the multiple connector sets are coupled to the center support through a connector holder, wherein the connector holder has a center opening that allows the center support to pass therethrough.

8. The cable connection structure of claim 1, further comprising:

a front cap removably coupled a front end of the connection tube.

9. The cable connection structure of claim 8, further comprising:

a gripper disposed on the front cap.

10. The cable connection structure of claim 1, wherein each of fiber optic connectors is configured to couple to a corresponding adaptor disposed in a fiber optic module.

11. The cable connection structure of claim 1, wherein the ribbon cable is configured to further connect to a cable collecting connector.

12. The cable connection structure of claim 11, wherein the cable collecting connector is configured to connect the ribbon cable to one or more connecting cables.

13. The cable connection structure 1, wherein the ribbon cable or the connecting cable is configured to pass through an opening defined in a wall.

14. A cable management system, comprising:

a cable connection structure configured to directly connect a plurality of fiber cable connectors to a ribbon cable that forgoes a splicing structure, wherein the cable connection structure comprises:

at least one connector set including a plurality of fiber optic connectors, wherein each of the fiber optic connector has a corresponding connecting cable coupled thereto;

a cable sorter having a first end connected to the connecting cable; and a ribbon cable connected to a second end of the cable sorter through a fiber cable clamp;

a connection tube having a center opening that allows the connector set to be disposed therein; and an end cap removably coupled to a back end of the connection tube, wherein the end cap has a through hole that allows the cable sorter to pass therethrough.

15. The cable management system of claim 14, wherein the cable connection structure directly connects a first set of fiber optic connectors disposed in a first fiber optic module to a second set of the fiber optic connector disposed in a second fiber optic module.

16. The cable management system of claim 15, wherein the first fiber optic module is positioned in a first room and the second fiber optic module is positioned in a second room different from the first room.

17. The cable management system of claim 16, wherein the cable connection structure passes through a wall defined between the first room and the second room.

18. A method for fiber optic connector connection, comprising:

connecting a cable connection structure between a first fiber optic module positioned in a first room and a second fiber optic module positioned in a second room, wherein the cable connection structure forgoes a splicing structure, wherein the cable connection structure has a first end comprising a first group of fiber optic connectors positioned in the first fiber optic module and a second end comprising a ribbon cable connecting a second group of fiber optic connectors positioned in the second fiber optic module, wherein the cable connection structure includes a connection tube having a center opening that allows the fiber optic connectors to be disposed therein, and an end cap removably coupled to a back end of the connection tube, wherein the end cap has a through hole that allows a cable sorter to pass therethrough.

* * * * *